United States Patent [19]

Amini et al.

[11] Patent Number: 5,333,274
[45] Date of Patent: Jul. 26, 1994

[54] ERROR DETECTION AND RECOVERY IN A DMA CONTROLLER

[75] Inventors: Nader Amini; Bechara F. Boury; Sherwood Brannon; Richard G. Hofmann; Terence J. Lohman, all of Boca Raton, Fla.

[73] Assignee: International Business Machines Corp., Armonk, N.Y.

[21] Appl. No.: 778,040

[22] Filed: Oct. 15, 1991

[51] Int. Cl.$^5$ .............................................. G06F 13/00
[52] U.S. Cl. ..................................... 395/275; 395/425; 395/575
[58] Field of Search ............... 395/275, 425, 575, 700, 395/250

[56] References Cited

U.S. PATENT DOCUMENTS 4,493,035 1/1985 MacGregor et al. .
4,607,366 8/1986 Stadlmeier et al. .
4,797,853 1/1989 Savage et al. .
4,837,677 6/1989 Burrus, Jr. et al. .
4,891,810 1/1990 de Corlieu et al. ................. 371/9.1
4,959,782 9/1990 Tulpule et al. ...................... 364/200

FOREIGN PATENT DOCUMENTS 58-159129 9/1983 Japan .
60-116061 6/1985 Japan .

Primary Examiner—Robert L. Richardson
Attorney, Agent, or Firm—Robert S. Babayi

[57] ABSTRACT

A DMA controller with error circuitry which detects DMA error conditions is disclosed. The error circuitry causes the DMA controller to perform completion tasks before terminating a DMA transfer, advantageously providing a DMA controller which may exit gracefully upon detection of an error condition with the potential of error recovery.

15 Claims, 12 Drawing Sheets

ERROR DETECTION AND RECOVERY IN A DMA CONTROLLER

Cross-reference to Related Applications

This application is related to the commonly-assigned application of Bechara F. Boury, Richard G. Hofmann and Terence J. Lohman titled "Selectable Refresh in an Information Handling System", Ser. No. 07/777,778 filed Oct. 15, 1991 the commonly-assigned application of Nader Amini, Bechara F. Boury and Terence J. Lohman titled "DMA Data Buffering Using a FIFO with Memory Backup", Ser. No. 07/778,042 filed Oct. 15, 1991; the commonly-assigned application of Nader Amini, Bechara F. Boury, Sherwood Brannon, Ian Concilio, Richard G. Hofmann and Terence J. Lohman titled "Dynamic Bus Sizing of DMA Transfers", Ser. No. 07/776,924 filed Oct. 15, 1991; the commonly-assigned application of Nader Amini, Bechara F. Boury, Sherwood Brannon and Terence J. Lohman titled "Expandable High Performance FIFO Design", Ser. No. 07/778,298 filed Oct. 15,1991; the commonly-assigned application of Bechara F. Boury, Terence J. Lohman and Long D. Nguyen titled "CPU Bus Allocation Control", Ser. No. 07/778,041 filed Oct. 15, 1991; and, the commonly assigned application of Nader Amini, Bechara F. Boury and Terence J. Lohman titled "Controlling Bus Reallocation Using Arbitration Hold", Ser. No. 07/777,777 filed Oct. 15, 1991 all of are hereby incorporated by reference.

BACKGROUND OF THE INVENTION

The present invention relates to information handling systems, and more particularly to error detection and recovery during direct memory access of memory in personal computer systems.

Generally in computer systems and especially in personal computer systems, data are transferred between various elements such as a central processing unit (CPU), memory devices and direct memory access (DMA) control circuitry as well as expansion devices such as input/output (I/O) adapters, bus controllers (i.e., elements which can control the computer system), bus slaves (i.e., elements which are controlled by bus controllers). The expansion devices are often interconnected via a system I/O bus. The DMA control circuitry is used to transfer information to and from memory devices without using the CPU; generally, once the CPU has provided the DMA control circuitry with control information such as the base location from where information is to be moved, the address of where the data information should go, and the size of the data information to be moved, the DMA control circuitry controls the transfer of the data information.

Often in computer systems it is necessary for expansion devices to arbitrate for ownership of the I/O bus of the computer system; i.e., to decide which expansion device may transfer information via the I/O bus. For the purposes of arbitration the DMA controller is treated as if it is an expansion device such that the DMA controller must arbitrate with other expansion devices in order to win permission to transfer information via the I/O bus. It is known to provide an arbiter which determines which expansion device may transfer information via the I/O bus. Such an arbiter serves as a central arbitration control point via which all arbitration for the I/O bus occurs.

The I/O bus operates in time divided units which are called bus cycles. Bus cycles of the I/O bus are divided into arbitration cycles and grant cycles. During arbitration cycles, expansion devices compete for ownership of the I/O bus. During grant cycles, a device which has won ownership of the bus, transfers information. Normally, during arbitration cycles, information is not transferred via the bus. However, it is known to perform refresh operations, in which the memory of the system is refreshed, during arbitration cycles.

One way of initiating an arbitration cycle is by an expansion device which desires to transfer information via the bus generating a preempt signal. When the preempt signal is received by the expansion device which currently owns the bus it causes the device to relinquish its control so that another arbitration cycle may occur.

It is known to provide a computer system with the ability to determine whether an error condition has occurred during operation. Generally, when an error condition occurs, the computer system will cease operation (i.e., crash) because the error condition causes uncertainty in the information which the computer system is processing. An example of an error condition is a bus timeout where a device which owns the bus will not relinquish control of the bus causing the computer system to force the device to relinquish control of the bus.

SUMMARY OF THE INVENTION

It has been discovered that providing a DMA controller with error circuitry which detects DMA error conditions, the error circuitry causing the DMA controller to perform completion tasks before terminating a DMA transfer, advantageously provides a DMA controller which may exit gracefully upon detection of an error condition with the potential of error recovery.

DETAILED DESCRIPTION

Figure 1:
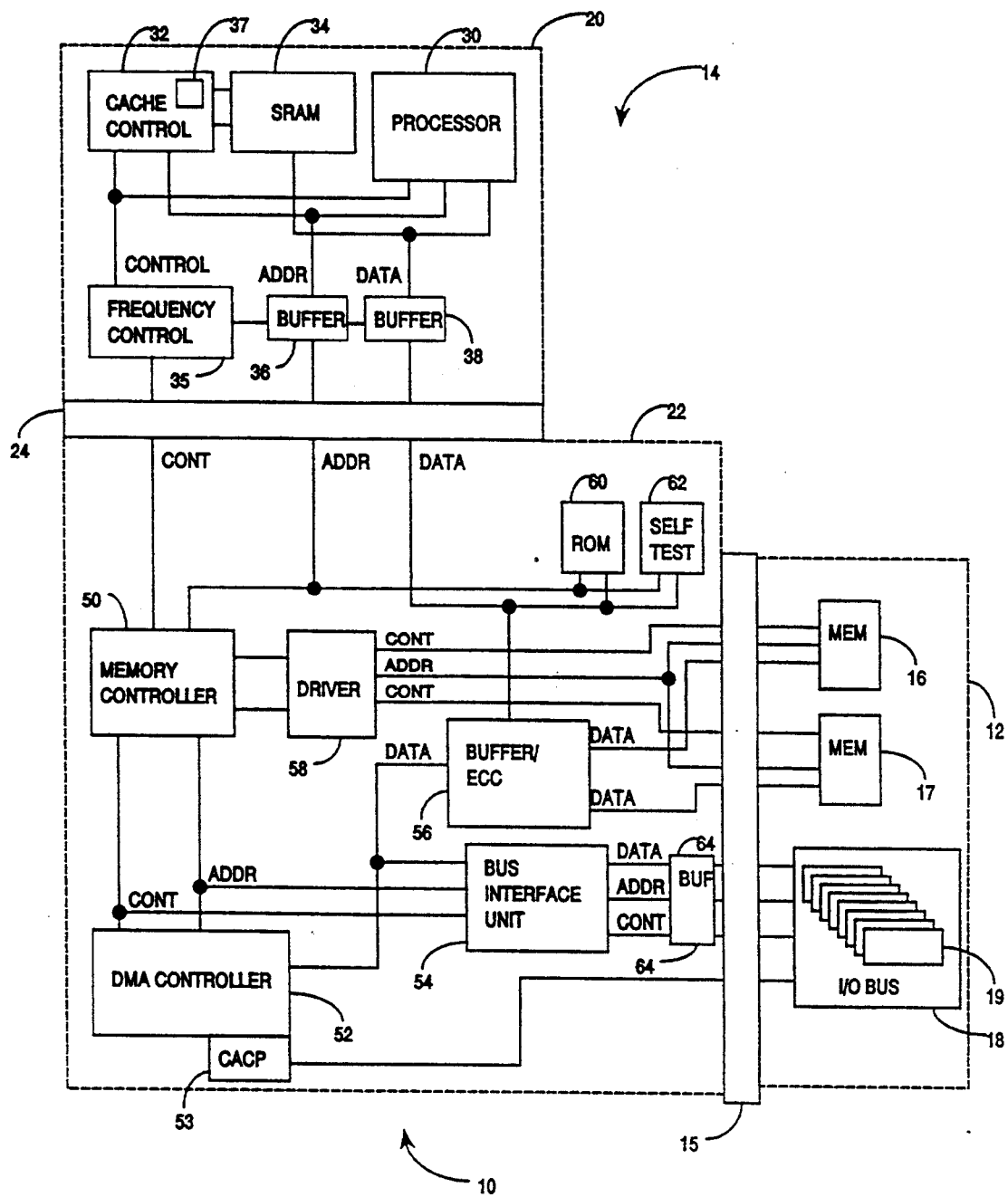
FIG. 1 is a schematic block diagram of a computer system which includes a DMA controller and a central arbitration control point according to the present invention.

Referring to FIG. 1, computer system 10 includes system board (i.e., planar) 12 as well as processor complex 14. Processor complex 14 is connected to planar 12 via processor complex connector 15. Planar 12 includes memories 16, 17 as well as input/output (I/O) bus 18, which may for example conform to the MICRO CHANNEL computer architecture. Memories 16, 17 are arranged as an interleaved system memory. Expansion devices 19 may be connected to computer 10 via I/O bus 18. Planar 12 may also include conventional video circuitry, timing circuitry, keyboard control circuitry and interrupt circuitry (all not shown) which are used by computer 10 during normal operation.

Processor complex 14 includes processor portion 20 and base portion 22. Processor portion 20 is connected to base portion 22 via local bus connector 24. Processor portion 20 operates at 50 MHz and base portion 22 operates at 40 MHz.

Processor portion 20 includes microprocessor 30 (e.g., available from Intel, Inc. under the trade designation 486), cache control module 32, memory 34 (e.g., static random access memory (SRAM)), and frequency control module 35 as well as address buffer 36 and data buffer 38. A data information path is provided between microprocessor 30, memory 34 and data buffer 38. An address information path is provided between microprocessor 30, cache control circuit 32 and address buffer 36. A control information path is provided between microprocessor 30, cache control module 32 and frequency control module 35. Additionally, an address information path and a control information path are provided between cache control module 32 and memory 34. The data, address and control information paths represent a processor bus.

Memory 34 provides a cache function by storing in short term memory information from either memories 16, 17 or from memory which is located on an expansion device 19. Cache control module 32 includes tag random access memory (RAM) 37 which stores the address of memories 16, 17 to which the information which is stored in memory 34 corresponds.

Frequency control module 35 synchronizes the 50 MHz processor portion with the 40 MHz base portion; frequency control module 35 also controls buffers 36, 38. Accordingly, frequency control module 35 determines when information is captured by buffers 36, 38 and when information that is stored in buffers 36, 38 is overwritten. Buffers 36, 38 are configured to allow two writes from memories 16, 17 to be stored in buffers 36, 38 simultaneously. Buffers 36, 38 are bidirectional, i.e., buffers 36, 38 can latch information which is provided by processor portion 20 and information which is provided to processor portion 20. Because buffers 36, 38 are bidirectional, processor portion 20 may be replaced or upgraded while maintaining a standard base portion 22.

Base portion 22 includes memory controller 50, direct memory access (DMA) controller 52, central arbitration control point (CACP) circuit 53, bus interface unit 54 and buffer/error correction code (ECC) circuit 56. Base portion 22 also includes driver circuit 58, read only memory (ROM) 60, self test circuit 62 and buffer circuit 64. A control information path is provided between memory controller 50 and frequency control module 35 of processor portion 20. Control information paths are also provided between: memory controller 50, DMA controller 52 and bus interface unit 54; memory controller 50 and driver 58; driver 58 and memories 16, 17; bus interface unit 54 and buffer 64; buffer 64 and I/O bus 18 of planar 12; and, CACP 53 and I/O bus 18 of planar 12. An address information path is provided between memory controller 50, ROM 60 and self test circuit 62 as well as address buffer 36 of processor portion 20. Address information paths are also provided between: memory controller 50, DMA controller 52 and bus interface unit 54; memory controller 50 and driver 58; driver 58 and memories 16, 17; bus interface unit 54 and buffer 64; and, buffer 64 and I/O bus 18 of planar 12. A data information path is provided between buffer/ECC circuit 56, ROM 60, and self test circuit 62 as well as data buffer 38 of processor portion 20. Data information paths are also provided between: buffer/ECC circuit 56, DMA controller 52 and bus interface unit 54; buffer/ECC circuit 56 and memory 16; buffer/ECC circuit 56 and memory 17; bus interface unit 54 and buffer 64; and, buffer 64 and I/O bus 18 of planar 12.

Memory controller 50 analyzes address information which is received from processor portion 20 to determine if this information corresponds to an address of memories 16, 17 or to an address of memory which is on an expansion device 19 (i.e., expansion memory). If the address information corresponds to an address of memories 16, 17, then memory controller 50 initiates a planar memory cycle to memories 16, 17. The address which is provided to memories 16, 17 during a planar memory cycle is based upon the address which is provided by processor portion 20; however, because memory controller 50, and memories 16, 17 know their location with reference to a much larger address spectrum, the address which is provided to memories 16, 17 need only be 10-bits wide compared to the 32-bit wide address which is provided by processor portion 20. While the planar memory cycle is occurring, memory controller 50 allows either DMA controller 52, or a bus master expansion device 19 to access information via I/O bus 18.

If the address information corresponds to an expansion memory address, then memory controller 50 initiates an expansion memory cycle with the expansion memory. During an expansion memory cycle, the address which is provided to memory controller 50 is provided via bus interface unit 54 to I/O bus 18. The expansion device which includes the memory to which the address corresponds receives the memory address from I/O bus 18. If the data is being retrieved from the expansion memory, the data information which is stored in the expansion memory is provided to processor portion 20 via I/O bus 18, buffer circuit 64, bus interface unit 54 and buffer/ECC circuit 56. If the data is being written to the expansion memory, the data information is provided to the expansion memory via bus interface unit 54 and I/O bus 18. Also, DMA controller 52 controls interchanging information between memories 16, 17 and memory which is on an expansion device 19.

DMA controller 52 provides three functions for processor complex 14. DMA controller 52 utilizes a small computer subsystem control block (SCB) architecture to configure DMA channels, thus avoiding the necessity of using programmed I/O to configure DMA channels. DMA controller 52 also provides a buffering function to optimize transfers between slow expansion devices and fast memory devices. DMA controller 52 also provides an eight channel, 32-bit data, address and byte transfer count direct memory access function. When providing the DMA function, DMA controller 52 may function in two modes. In a first mode, DMA controller 52 functions in a programmed I/O mode in which DMA controller 52 is functionally an I/O slave. In a second mode, DMA controller 52 functions as a DMA bus master, in which DMA controller 52 arbitrates for and controls I/O bus 18. During this second mode, DMA controller 52 uses a first in, first out (FIFO) register circuit; data from a source is passed through the FIFO register circuit prior to being provided to a destination. Accordingly, a serial DMA operation is performed.

CACP 53 functions as the arbiter for computer system 10. CACP 53 receives arbitration control signals from DMA controller 52 as well as expansion devices 19 and controls, by provided arbitration control information, which device may transfer information via I/O bus 18 and for how long a particular device may control (i.e., own) I/O bus 18.

Bus interface unit 54 provides the bi-directional interface between the architecture of processor complex 14 and the architecture of I/O bus 18. Bus interface unit 54 also provides a buffering function to optimize the interface between the two architectures. Bus interface unit 54 also provides a bus sizing function. I.e., bus interface unit 54 can receive information in 32-bit wide segments and provide the information to I/O bus 18 in smaller segments depending on the requirements of the expansion device 19 with which processor complex 14 is communicating.

Buffer/ECC circuit 56 provides a data path between processor portion 20 and memories 16, 17, a data path between memories 16, 17 and DMA controller 52 and bus controller 54. Buffer/ECC circuit 56 also provides a data path between processor portion 20 and DMA controller 52 and bus interface circuit 54. Buffer/ECC circuit 56 checks for errors via error correction code; additionally, buffer/ECC circuit 56 is capable of operating with and supporting parity memory for downward compatibility with planars 12 which include parity memory.

Driver circuit 58 provides control information and address information from memory controller 50 to memories 16, 17. Driver circuit 58 drives this information based upon the number of single in-line memory modules (SIMMs) which are used to provide memories 16, 17. I.e., driver circuit 58 varies the signal intensity of the control and address information which is provided to memories 16, 17 based upon the size of memories 16, 17. The size of memories 16, 17 is determined by software during an initialization of computer 10.

Buffer circuit 64 provides isolation between base portion 22 and planar 12. Buffer circuit 64 uses buffers which allow buffer circuit 64 to capture boundary information between I/O bus 18 and bus interface unit 54 in real time; i.e., the buffers store the information as it appears at connector 15. Accordingly, if computer 10 experiences a failure condition, buffer circuit 64 may be accessed by a computer repair person to determine the information which was present at connector 15 upon failure of computer 10.

Self test circuit 62, which is connected to a plurality of locations within base portion 22, provides a plurality of self test features. Self test circuit 62 accesses buffer circuit 64 to determine if failure conditions exist. Self test circuit 62 also tests the other major components of base portion 22 upon power-on to determine whether computer 10 is ready for operation.

Figure 2:
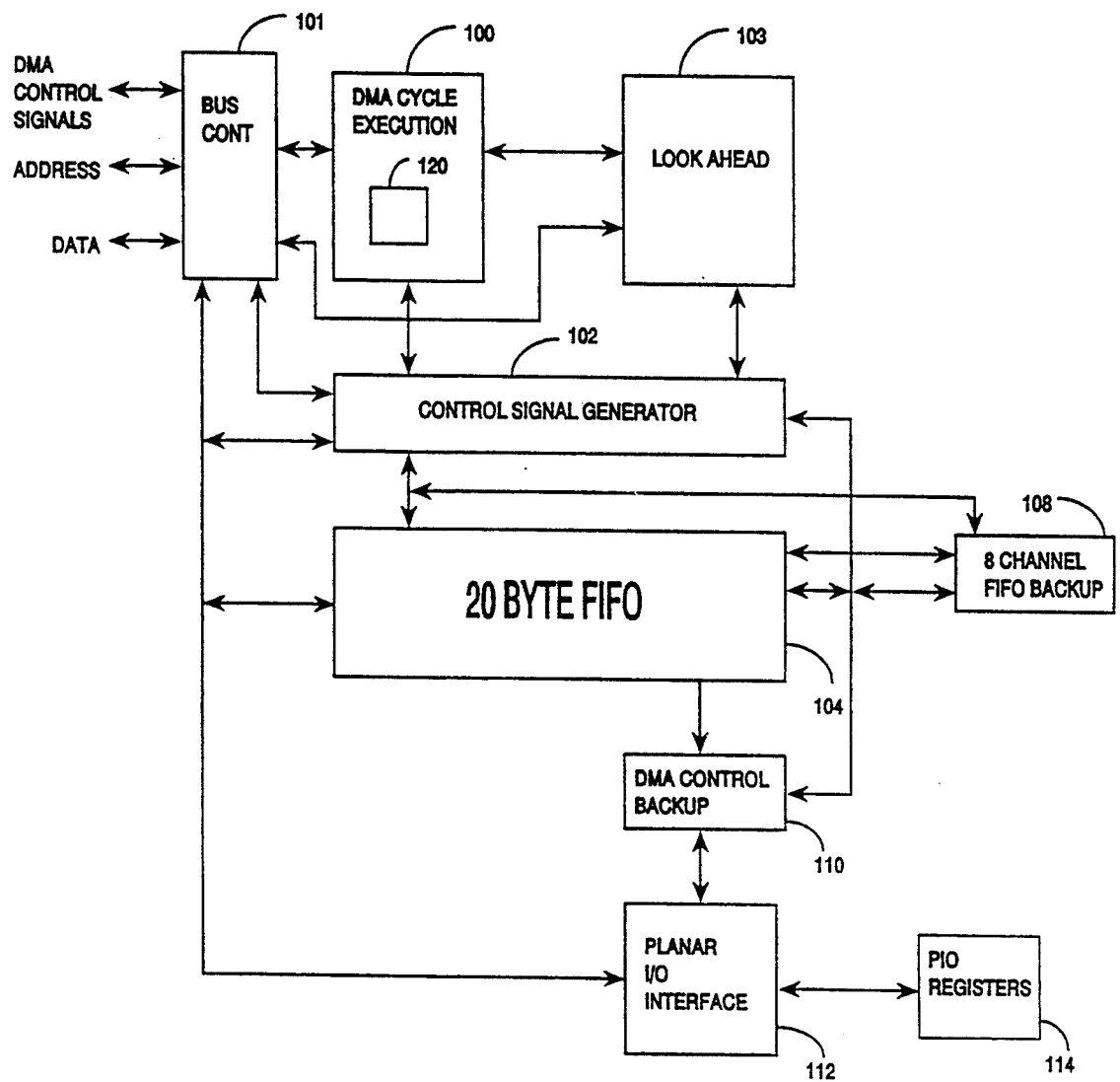
FIG. 2 is a schematic block diagram of a DMA controller according to the present invention.

Referring to FIG. 2, DMA controller 52 includes DMA cycle execution circuit 100, bus control circuit 101, control signal generator circuit 102, look ahead circuit 103, first in, first out (FIFO) register circuit 104, FIFO register backup circuit 108, DMA control backup circuit 110, planar I/O interface circuit 112, program-/input/output (PIO) register circuit 114 and error detection circuit 115. The combination of cycle execution circuit 100, control signal generator circuit 102, look ahead circuit 103 and DMA backup controller 110 function as DMA control circuitry.

DMA cycle execution circuit 100, which includes DMA control state machine 120, functions as the overall controller of DMA controller 52. I.e., DMA cycle execution circuit 100 orchestrates the operation of DMA controller 52 by providing high level control information. DMA cycle execution circuit 100 provides control information to control signal generator circuit 102 and receives count information from control signal generator circuit 102. DMA cycle execution circuit 100 also provides information to and receives information from look ahead circuit 103 and DMA control backup circuit 110. DMA cycle execution circuit 100 also provides, via bus control circuit 101, DMA control signals to and receives DMA control signals from the control information path between memory controller 50, DMA controller 52 and bus interface unit 54 of base portion 22.

Bus control circuit 101 functions as the interface between DMA controller 52 and any circuits which communicate with DMA controller 52. Bus control circuit 101 includes the circuitry which is necessary for receiving external signals and providing these signals to the appropriate circuit of DMA controller 52. Bus control circuit 101 also includes the necessary logic to transmit signals which are generated by circuits of DMA controller 52.

Control signal generator circuit 102 is the functional, basic controller of DMA controller 52. I.e., control signal generator 102 generates individual control signals based upon the high level control information which is received from DMA cycle execution circuit 100. Control signal generator circuit 102 provides information to and receives information from FIFO register circuit 104 as well as look ahead circuit 103. Control signal generator circuit 102 also provides information to and receives information from DMA control backup circuit 110. Control signal generator circuit 102 also provides, via bus control circuit 101, address signals to the address information path between memory controller 50, DMA controller 52 and bus interface unit 54 of base portion 22.

Look ahead circuit 103 performs a dynamic bus sizing function. Look ahead circuit 103 generates control information for a plurality of bus sizes (e.g., 8-bit, 16-bit and 32-bit wide buses) as soon as a bus cycle begins. The control information includes input variables for state machine 120 of DMA cycle execution circuit 100 as well as byte enable signals, FIFO control signals, address control signals, count control signals and data control signals for control signal generator circuit 102. By continuously generating this information, look ahead circuit 103 allows DMA controller to switch on the fly between different bus sizes during every bus cycle. By generating the control information in parallel, look ahead circuit 103 allows DMA controller 52 to run memory or I/O transfers with no additional wait states. E.g., a memory packet transfer requires only six clock cycles and an I/O or single memory transfer requires only three clock cycles.

Look ahead circuit 103 also generates the control information necessary for the initial transfer of a bus cycle. Accordingly, look ahead circuit 103 also allows DMA controller to perform zero wait state packet transfers to system memory 16, 17.

FIFO register circuit 104, which is a 20-byte FIFO, performs a holding function for DMA controller 52. FIFO register circuit 104 allows for accumulating data so that the memory portion of a transfer can be aligned on a 16-byte packet boundary, thus allowing memory transfers to occur in 16-byte packet transfers. Packet transfers allow one address to be provided for a plurality of data bytes (e.g., one address for four 32-bit words). By providing a 20-byte FIFO, the chances of finding a packet boundary of a 16-byte packet are increased. FIFO register circuit 104, via bus control circuit 101, provides data information to and receives data information from the data information path between DMA controller 52, bus interface unit 54 and buffer-/ECC circuit 56. FIFO register circuit 104 also provides data information to and receives data information from FIFO backup circuit 108 as well as providing control information to DMA control backup circuit 110.

FIFO register circuit 104 is also used to load subsystem control blocks (SCB's) of data; each SCB is 16 bytes in length. The SCB's are stored in DMA control backup circuit 110 when DMA controller 52 is functioning in the bus master mode. Accordingly, DMA controller 52 can configure a DMA channel in one 16 byte packet transfer compared to programming a DMA channel using the PIO interface and individual I/O cycles. By using DMA controller 52 to configure the DMA channels, processor 30 is not required.

FIFO backup circuit 108 performs a channel backup function for DMA controller 52. FIFO backup circuit 108 is an eight channel backup circuit; each channel being capable of storing 20 bytes of data as well as 29 FIFO state control bits. By providing a backup memory which is the same width as FIFO register circuit 104, all of the information which is stored in FIFO register circuit 104 at any given time can be backed up and stored in a single memory clock cycle. By using FIFO backup circuit 108, DMA controller 52 has the ability to store information between DMA grant cycles. This information is called residual information. Accordingly, when a particular DMA channel regains control of I/O bus 18, clock cycles are saved as it is not necessary to retrieve the information from memory. The information is transferred between FIFO backup circuit 108 and FIFO register circuit 104 in parallel.

DMA control backup circuit 110 is an 8-channel storage device which stores control information provided by control signal generator circuit 102 and provides control information to control signal generator circuit 102. DMA control backup circuit 110 provides backup programming information to and receives backup programming information from planar I/O interface circuit 112 during PIO operations. DMA control backup circuit 110 also receives control information from and provides control information to bus controller 101 via FIFO register circuit 104 during SCB fetches.

Planar I/O interface circuit 112 controls transferring and storing information in PIO registers 114 as well as DMA control backup 110. Planar I/O interface circuit provides PIO programming information to and receives PIO programming information from PIO registers 114.

PIO registers 114 store program information which is used during the operation of DMA controller 52. PIO registers include eight channels, corresponding to the eight channels of DMA controller 52. Each channel stores control information for a corresponding channel of DMA controller 52.

Error detection circuit 115 monitors possible error conditions and generates DMA error indication information based upon these conditions. Error detection circuit 115 receives information from DMA control backup circuit 110 and DMA state machine 120 and provides the error indication information to bus controller 101.

Figure 3:
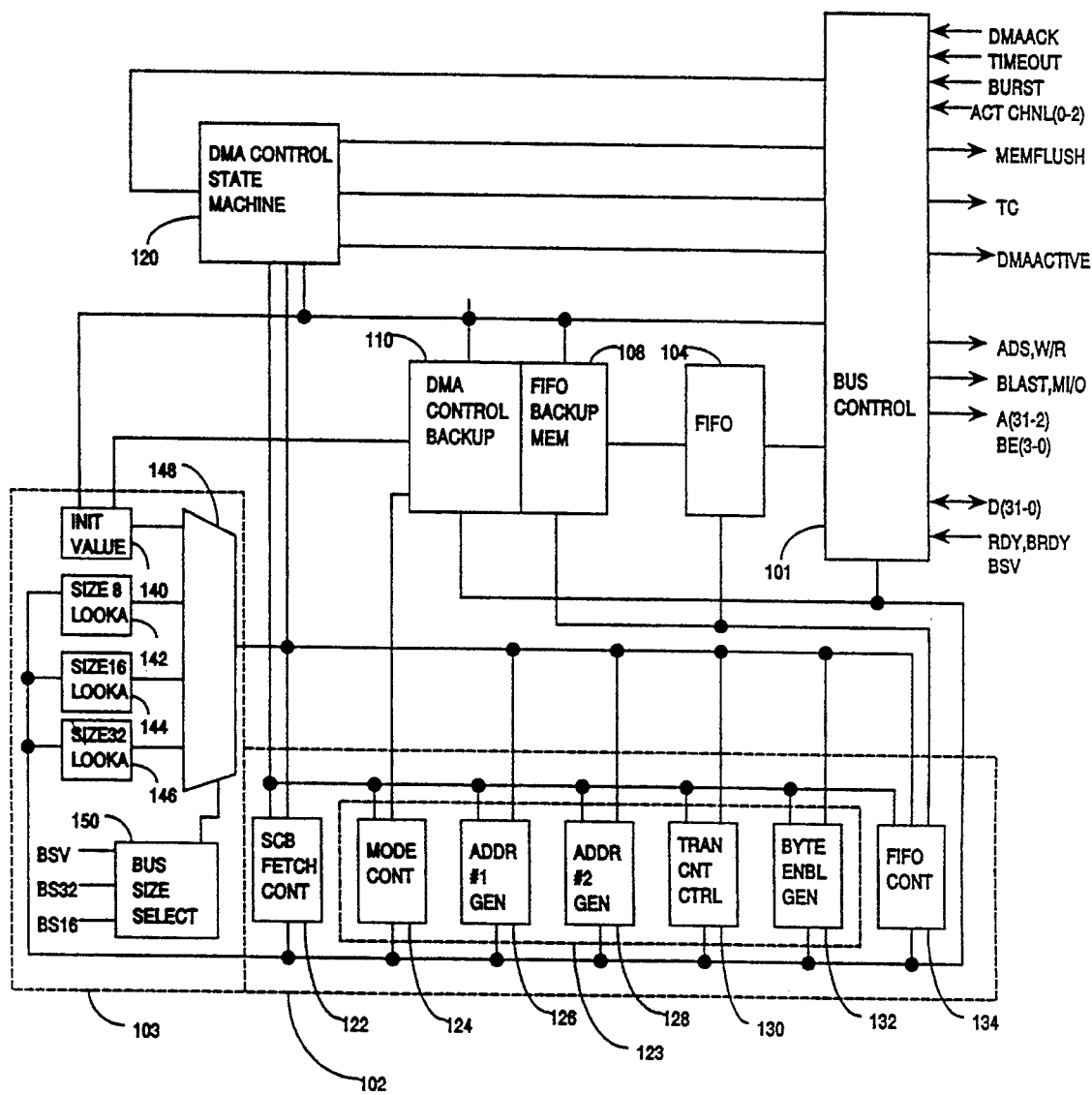
FIG. 3 is a schematic block diagram of a portion of the FIG. 2 DMA controller.

Referring to FIG. 3, bus control circuit 101 receives and provides a 32-bit data signal (D0-31), a 30 bit address signal (A2-31) and a four bit byte enable signal (BE0-3) as well as receiving a data ready signal (RDY) and a burst data ready signal (BRDY). Bus control circuit also receives DMA control signals, DMAACK, TIMEOUT, BURST and ACT CHNL(0-2). The DMAACK signal is a DMA acknowledge signal which indicates that DMA controller 52 has control of bus 18, the TIMEOUT signal is an error indication signal which indicates that DMA controller 52 should terminate transferring information, the BURST signal is provided by external devices to indicate that they are capable of sending or receiving more than one data transfer in a row, and the ACT CHNL(0-2) signal is a DMA channel active indication signal which indicates which channel of DMA controller 52 is active. Bus control circuit 101 transmits a burst last signal (BLAST), which is provided by DMA controller 52 to indicate that it intends to provide a packet transfer, an address strobe signal (ADS), which indicates when to sample address and control information, a write/read signal (W/R), which indicates whether a read or a write operation is to take place and a memory I/O signal (M/IO), which indicates whether a memory or I/O device is being accessed. Bus control circuit 101 also transmits DMA control signals MEMFLUSH, TC and DMAACTIVE. The MEMFLUSH signal indicates that remaining operations for a channel of DMA controller 52 are only memory write operations. The TC signal is a terminal count signal which is provided at the end of the last I/O cycle. The DMAACTIVE signal is a DMA active signal which stays active as long as DMA controller 52 is active (i.e., performing a transfer). Bus control circuit 101 also receives a bus size valid signal (BSV) and bus size indication signals (BS16, BS32). Information which is received by bus control circuit 101 is provided to DMA control state machine 120, DMA control backup circuit 110, FIFO backup memory 108 and FIFO register circuit 104. Information is also provided to and received from look ahead circuit 103 and control signal generator circuit 102.

Control signal generator circuit 102 includes SCB fetch controller 122; DMA transfer controller 123 which includes mode controller 124, first address generator 126, second address generator 128, transfer count controller 130, and byte enable generator 132; and, FIFO controller 134. SCB fetch controller 122 and FIFO controller 134 are control circuits of control signal generator circuit 102. Mode controller 124, first address generator 126, second address generator 128, transfer count controller 130 and byte enable generator 132 are also control circuits of control signal generator circuit 102.

SCB fetch controller 122 determines whether an SCB transfer should transpire. If so, then SCB fetch controller 122 initiates and completes an SCB transfer to DMA control backup circuit 110 via FIFO register circuit 104. Once the SCB transfer is completed, SCB fetch controller 122 provides a control signal to DMA control state machine which indicates that DMA transfers may be initiated. Once DMA controller 52 has been configured for a transfer, it is not necessary to reconfigure DMA controller 52 until the transfer is completed. SCB fetch controller 122 also allows chaining of a plurality of data blocks, thus allowing noncontiguous data blocks of information to be chained together.

DMA transfer controller 123 generates DMA transfer signals which are necessary to effectuate a DMA transfer. DMA transfer controller 123 generates these signals based upon control signals which are received from DMA control state machine. More specifically, the control circuits of DMA transfer controller 123 generate these DMA transfer signals.

Mode controller 124 of DMA transfer controller 123 interprets mode information which is stored in DMA control backup circuit 110 and provides control information to DMA control state machine 120 of DMA cycle execution circuit 100 based upon the mode information. Examples of different modes in which DMA controller 52 may function include I/O to memory transfers, memory to I/O transfers, and memory to memory transfers; for each of these modes, different operations may be performed by control circuits of control signal generator circuit 102 under control of DMA control state machine 120. Mode controller 124 also sets forth other aspects of a DMA transfer, e.g., whether FIFO register circuit 104 is required and thus should be enabled for a particular DMA transfer.

First address generator 126 and second address generator 128 of DMA transfer controller 123 generate address signals which represent a source address and a destination address for a DMA transfer. If the transfer is to or from an I/O device, then the first address generator remains constant. If the transfer is a memory to memory transfer, then both address signals are generated continuously during the transfer. First address generator 126 and second address generator 128 generate the address signals under control of DMA control state machine 120. First address generator 126 may generate either the source or the destination address; second address generator 128 generates the address which was not generated by first address generator 126.

Transfer count controller 130 generates transfer control information based upon the size of the block of information which is transferred during a particular transfer. When a transfer is initiated, transfer count controller 130 is loaded with control information indicating the size of the block of information which is to be transferred. This information is decremented with each byte that is transferred; when the transfer count equals zero, transfer count controller 130 provides a transfer count signal to DMA control state machine 120 which indicates that the transfer is complete.

Byte enable generator 132 generates the necessary byte enable signals at the beginning of each cycle, thus indicating which bytes to transfer during a particular DMA transfer. Byte enable generator 132 also generates byte enable signals which are provided to FIFO controller 134, thus allowing FIFO controller 134 to determine in which locations of FIFO register circuit 104 valid data information is stored.

FIFO controller 134 includes circuitry which generates FIFO control signals which are used to move bytes of data information into the stack of FIFO register circuit 104. The control signals also produce a count of how many bytes of information have been loaded into FIFO register circuit 104. This count information is used to determine how full FIFO register circuit 104 is to determine when to transition between states. FIFO control information which is generated by FIFO controller 134 is also provided to FIFO backup memory 108.

Look ahead circuit 103 includes initial value circuit 140, size-8 look ahead circuit 142, size-16 look ahead circuit 144, size-32 look ahead circuit 146 which all provide control information to multiplexer circuit 148 as well as bus size select circuit 150 which provides a control input signal to multiplexer circuit 148. Initial value circuit 140 generates the control information necessary for the initial transfer of a bus cycle; in generating the initial transfer information, initial value circuit 140 assumes the widest transfer size, i.e., 32-bit wide transfers. Size-8 look ahead circuit 142, size-16 look ahead circuit 144 and size-32 look ahead circuit 146 generate in parallel the sets of control information necessary for transfers of information based on the respective bus size. Multiplexer circuit 148 passes one of these sets of control information as a next set of control information based upon the present cycle's bus size under control of bus size select circuit 150. Bus size select circuit 150 receives the BSV, BS32 and BS16 signals, which indicate the bus size necessary for data information transfer, from bus controller 101 and selects the appropriate control information to pass for the next cycle based upon these signals. Because control information for each bus size is generated in parallel, as soon as a bus size is selected, the control information for this bus size may immediately be provided to control signal generator circuit 102 for generating the control information for the next cycle, thus decreasing latency between consecutive DMA bus cycles. Bus sizes may vary because expansion devices 19 transfer information in different bus sizes. Accordingly, DMA controller 52 may transfer information at a first bus size during a first cycle and at a second bus size during a second subsequent cycle. Thus, DMA controller 52 is capable of transferring data between system devices without any prior knowledge of their respective bus widths and with no reduction in system performance.

The output signal of multiplexer circuit 148 is provided to the control circuits of control signal generator circuit 102 and to DMA control state machine 120. These control circuits also provide and receive signals from DMA control state machine 120 and provide control signals to size-8 look ahead circuit 142, size-16 look ahead circuit 144 and size-32 look ahead circuit 146.

Error detection circuit 115 monitors information from DMA control backup circuit 110 and state machine 120 and generates a DMA error signal (DMA ABORT) which indicates that a DMA error has occurred. The DMA ABORT signal is provided to bus control circuit 101 which provides this signal to CACP 53.

Figure 4:
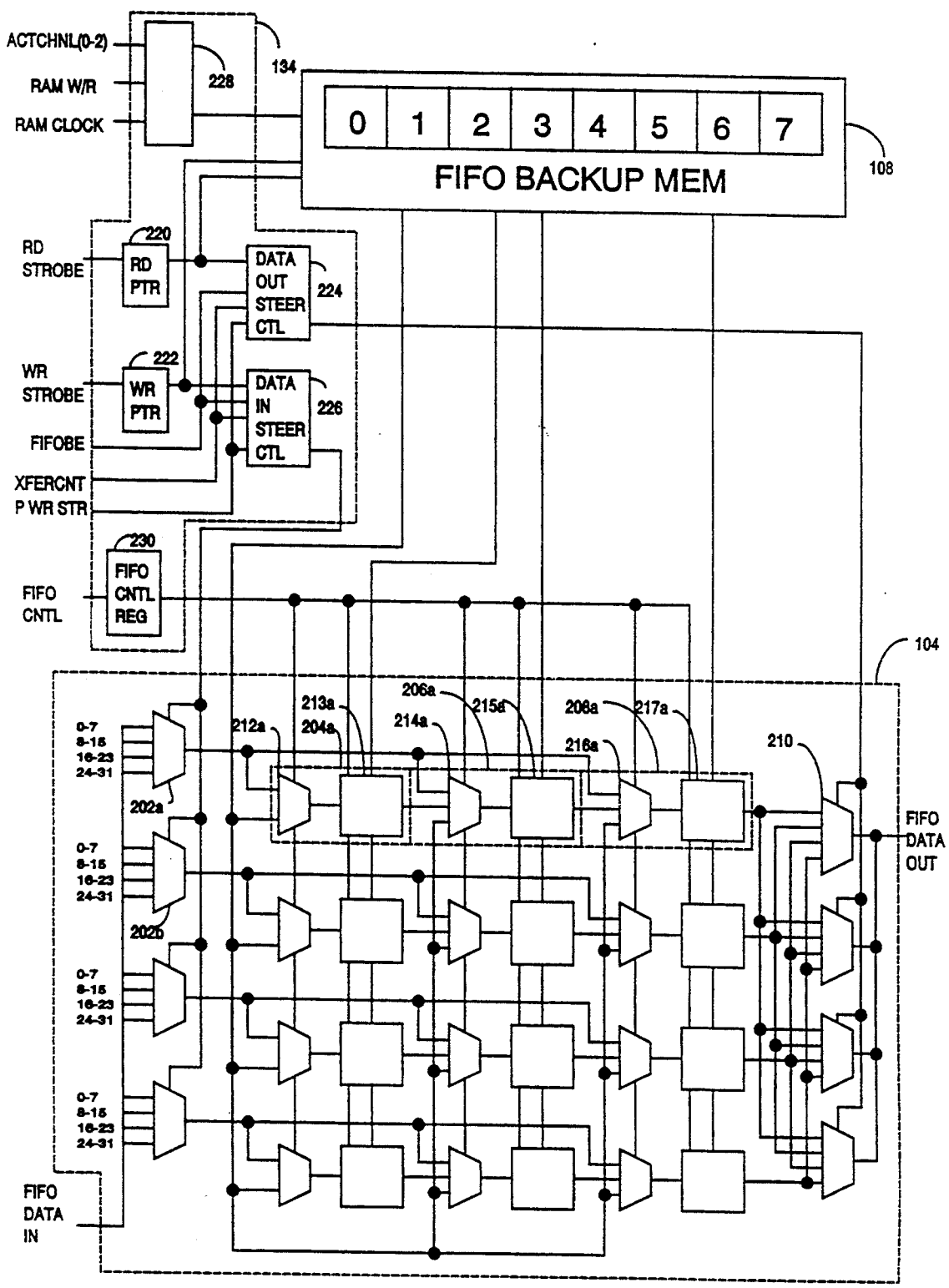
FIG. 4 is a schematic block diagram of the FIFO circuits of the DMA controller of FIGS. 2 and 3.

Referring to FIGS. 3 and 4, FIFO portion of DMA controller 52 includes FIFO buffer 104, FIFO backup memory 108 and FIFO controller 134 of control signal generator circuit 102. FIFO controller 134 of control signal generator circuit 102 provides control signals to FIFO buffer 104 and FIFO backup memory 108. FIFO backup memory 108 provides data information to FIFO buffer 104 in parallel and receives data information from FIFO buffer 104 in parallel. Accordingly, data information can be transferred between FIFO backup memory 108 and FIFO buffer 104 in a single memory cycle. Transfers of data occur under control of FIFO controller 134.

FIFO buffer circuit 104 includes input steering multiplexers 202, a plurality of buffer cells (e.g., final stage cells 204, intermediate stage cells 206 and initial stage cells 208) and output steering multiplexers 210. The buffer cells are arranged in rows (i.e., banks) and columns, each row consisting of a final stage cell 204, one or more intermediate stage cells 206, and an initial stage cell 208 and each column consisting of a plurality of final stage cells 204, intermediate stage cells 206 or initial stage cells 208. For a 20-byte FIFO register circuit, FIFO register circuit 104 includes three columns of intermediate cells as well as four rows of cells.

Input steering multiplexers 202 receive the 32-bit data signal from bus controller 101. Each multiplexer 202 provides eight bits of the data signal to a respective row of buffer cells, i.e., a respective final stage cell 204, a respective intermediate stage cell 206 and a respective initial stage cell 208 in parallel under control of FIFO controller 134. Final stage cells 204, intermediate stage cells 206 and initial stage cells 208 also receive data information in parallel from FIFO backup memory 108. Each final stage cell 204 provides a data information signal to a respective intermediate stage cell 206; each intermediate stage cell 206 provides a data information signal to another intermediate stage cell 206 or a respective initial stage cell 208. Initial stage cells 208 provide data information signals in parallel to output steering multiplexers 210 which combine the signals which are received from initial stage cells 208 to provide a 32-bit data signal to bus controller 101.

Each final stage cell 204 includes final stage cell multiplexer 212 and final stage cell control circuit 213. Each intermediate stage cell 206 includes intermediate stage cell multiplexer 214 and intermediate stage cell control circuit 215. Each initial stage cell includes initial stage cell multiplexer 216 and initial stage cell control circuit 217. The only difference between final stage cell multiplexer 212 and intermediate stage cell multiplexer 214 or initial stage cell multiplexer 216 is final stage cell multiplexer is a 2:1 mux whereas intermediate stage cell multiplexer 214 and initial stage cell multiplexer 216 are 3:1 muxes. Cell multiplexers 212, 214 and 216 all receive a data input signal from backup memory 108. All of the multiplexers 212, 214, 216 of a row of buffer cells also receive in parallel a data input signal from a respective input steering multiplexer 202. Intermediate cell multiplexer 214 also receives a data information signal from final stage control circuit 213; initial stage multiplexer 216 receives a data information signal from intermediate stage control circuit 215. Cell multiplexers 212, 214 and 216 select which input signal to pass under control of FIFO controller 134.

FIFO controller 134 includes read pointer 220, write pointer 222, data in steer controller 226 and data out steer controller 224 as well as backup memory control circuit 228 and FIFO control signal register circuit 230. Read pointer 220 receives a read strobe signal (RD STR) and generates read pointer signals, which are provided to data out steer controller 224 and FIFO backup memory 108. Write pointer 222 receives a write strobe signal (WR STR) and generates write pointer signals, which are provided to data in steer controller 226 and FIFO backup memory 108. Data out steer controller 224 and data in steer controller 226 also receive a FIFO byte enable signal (FIFOBE), a transfer count signal (XFERCNT), and a parallel write strobe signal (P WR STR). Data in steer controller 226 controls input steering multiplexers 202 based upon these signals and data out steer multiplexer 224 controls output steering multiplexers 210 based upon these signals. Backup memory control circuit 228 receives a 3-bit active channel indication signal (ACT CHNL(0-2)), a memory read or write signal (RAM W/R) and a memory clock signal (RAM CLK). FIFO control signal register circuit 230 receives a plurality of FIFO control signals and provides control signals to FIFO register circuit 104.

Figure 5:
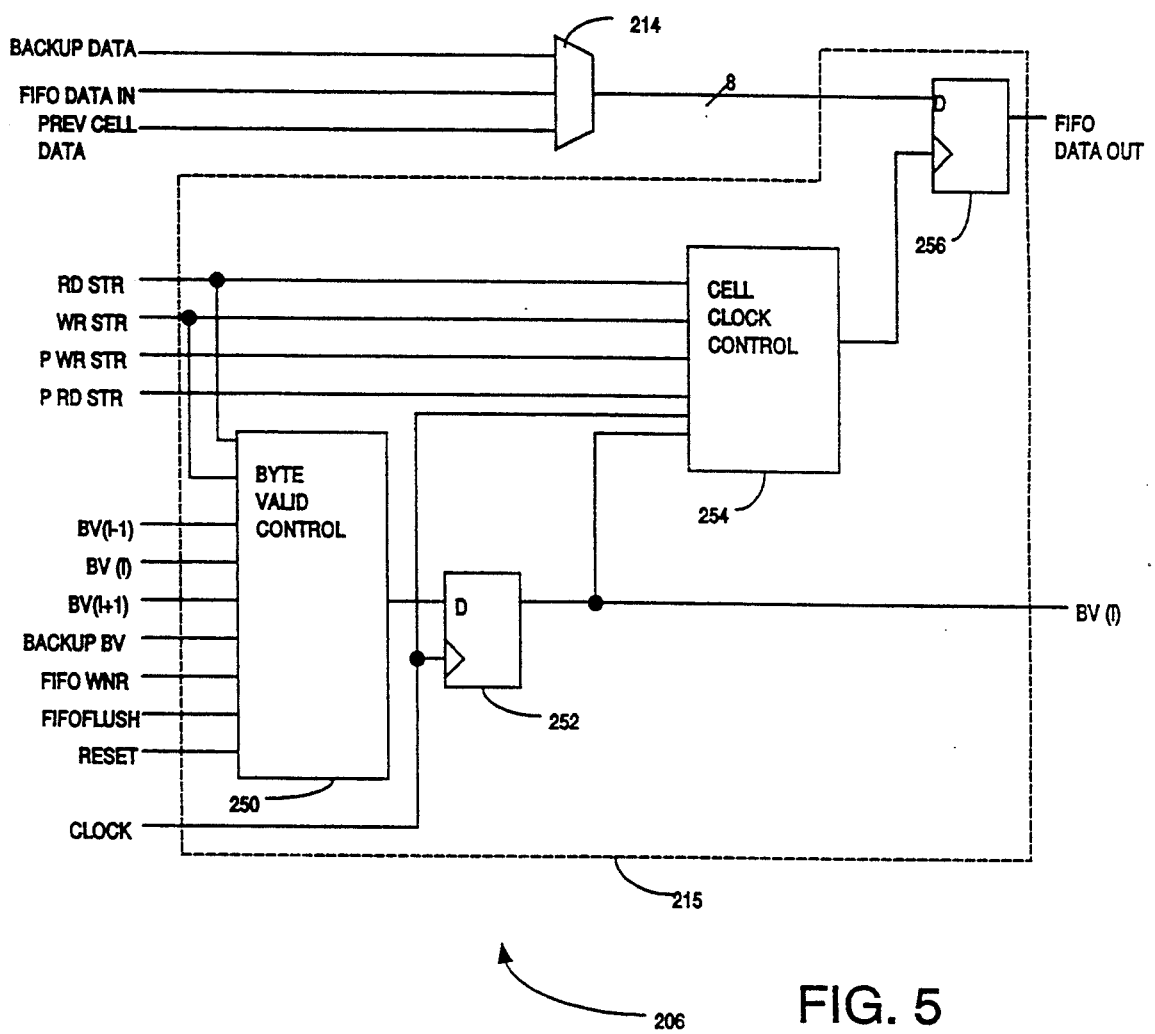
FIG. 5 is a schematic block diagram of a buffer circuit of a FIFO register circuit of the FIG. 4 FIFO circuits.
Figure 6:
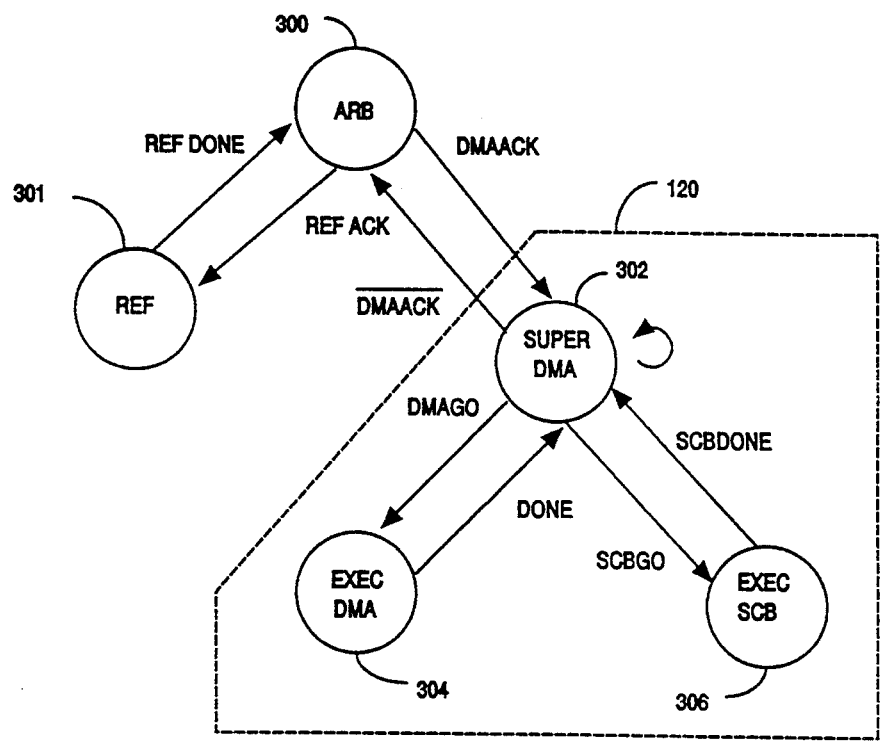
FIG. 6 is a state diagram of a high level state machine which is used in the operation of the FIG. 1 computer system.
Figure 13:
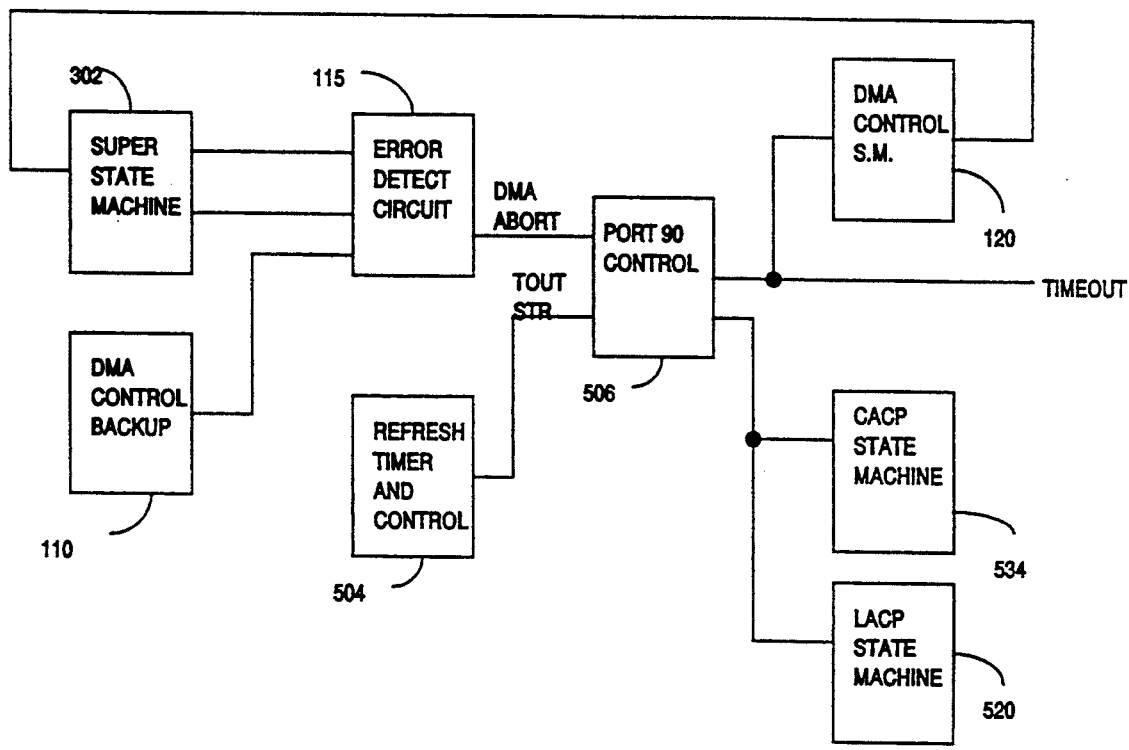
FIG. 13 is a diagrammatic-block diagram of the error recovery circuitry of the FIG. 1 computer system.

Referring to FIG. 5, intermediate stage cell control circuit 215 includes byte valid control circuit 250, byte valid flip flop 252, cell clock control circuit 254 and cell data register 256. Byte valid control circuit 250 determines whether a byte is to be stored by intermediate stage cell 206 based upon a plurality of control signals. Byte valid control circuit 250 indicates that a byte of data should be valid following the next clock cycle. Byte valid flip flop 252 synchronizes the output of byte valid control circuit 250 with the CLOCK signal, and then provides the BYTE VALID signal to cell clock control circuit 254, byte valid control circuit 250 and other neighboring cell control circuits 250. Cell clock control circuit 254 synchronizes the BYTE VALID signal with an appropriate strobe signal based upon the type of operation which is being performed by the buffer cell. The synchronized BYTE VALID signal is the clock gating input to flip flop 256 which synchronizes the FIFO data output signal based upon the input from multiplexer 214.

Byte valid control circuit 250 receives the WR STR and RD STR signals as well as byte valid signals (BV(I−1), BV(I) and BV(I+1). BV(I−1) is the BYTE VALID signal from a previous respective stage of FIFO register circuit 104 (i.e., the BYTE VALID signal from final stage cell 204); BV(I+1) is the BYTE VALID signal from a subsequent respective stage of FIFO register circuit 104 (i.e., the BYTE VALID signal from initial stage 208 or from a subsequent intermediate state 206). Byte valid control circuit 250 also receives byte control signals backup byte valid (BACKUP BYTE VALID), which is the BYTE VALID signal which corresponds the data information which is stored in FIFO backup memory 108, FIFO write not read (FIFO WNR), which indicated whether to write data information to or read data information from FIFO register circuit 104, FIFO flush (FIFO-FLUSH), which indicates when to clear the buffer cells after the information in the cells is backed up in FIFO backup memory 108, and a system reset signal (RESET), which resets all of the information of the FIFO circuits. Byte valid control circuit 250 provides a byte valid signal to flip flop 252 which is clocked by a cell clock signal (CLOCK). Flip flop 252 provides the clocked BYTE VALID signal to cell clock control circuit 254.

Cell clock control circuit 254 also receives the cell clock signals RD STR, WR STR, P RD STR and P WR STR as well as the CLOCK signal. Cell clock control circuit 254 provides a clocked BYTE VALID signal to the clock input terminal of flip flop 256, which receives the data output signal from intermediate stage cell multiplexer 214.

Referring to FIGS. 1-3, 6 and 9, in operation, CACP 53 performs an arbitration function under control of arbitration control state machine 300. Arbitration control state machine 300 actually includes both CACP state machine 534 and LACP state machine 520. During operation of computer system 10, one of these state machines is selected based upon the state of a mode indication signal (CACP MODE). However, the interaction between arbitration state machine 300, DMA control state machine 120 and refresh control state machine 301 remains the same regardless of whether arbitration state machine 300 is functioning in the CACP mode or the LACP mode. If during arbitration, DMA controller 52 wins ownership of bus 18, then the DMAACK signal is activated by CACP 53 and control shifts to supervisory state machine 302 of DMA control state machine 120, which also includes execution state machine 304. Supervisory state machine 302 performs initialization functions after which control is provided to execution state machine 304 as indicated by an active DMAGO signal. Execution state machine 304 controls the actual transfer of direct memory access information. After a transfer is complete, as indicated by an active DONE signal, control is transferred back to supervisory state machine 302, which performs completion functions, after which control is passed back to arbitration state machine 300, as indicated by an inactive DMAACK signal and another arbitration cycle is initiated. If during arbitration, a refresh operation is to be performed, as indicated by an active REF ACK signal, then control is passed to refresh control state machine 301. After the refresh operation is complete, as indicated by an active REF DONE signal, then control is passed back to arbitration state machine 300.

Figure 7:
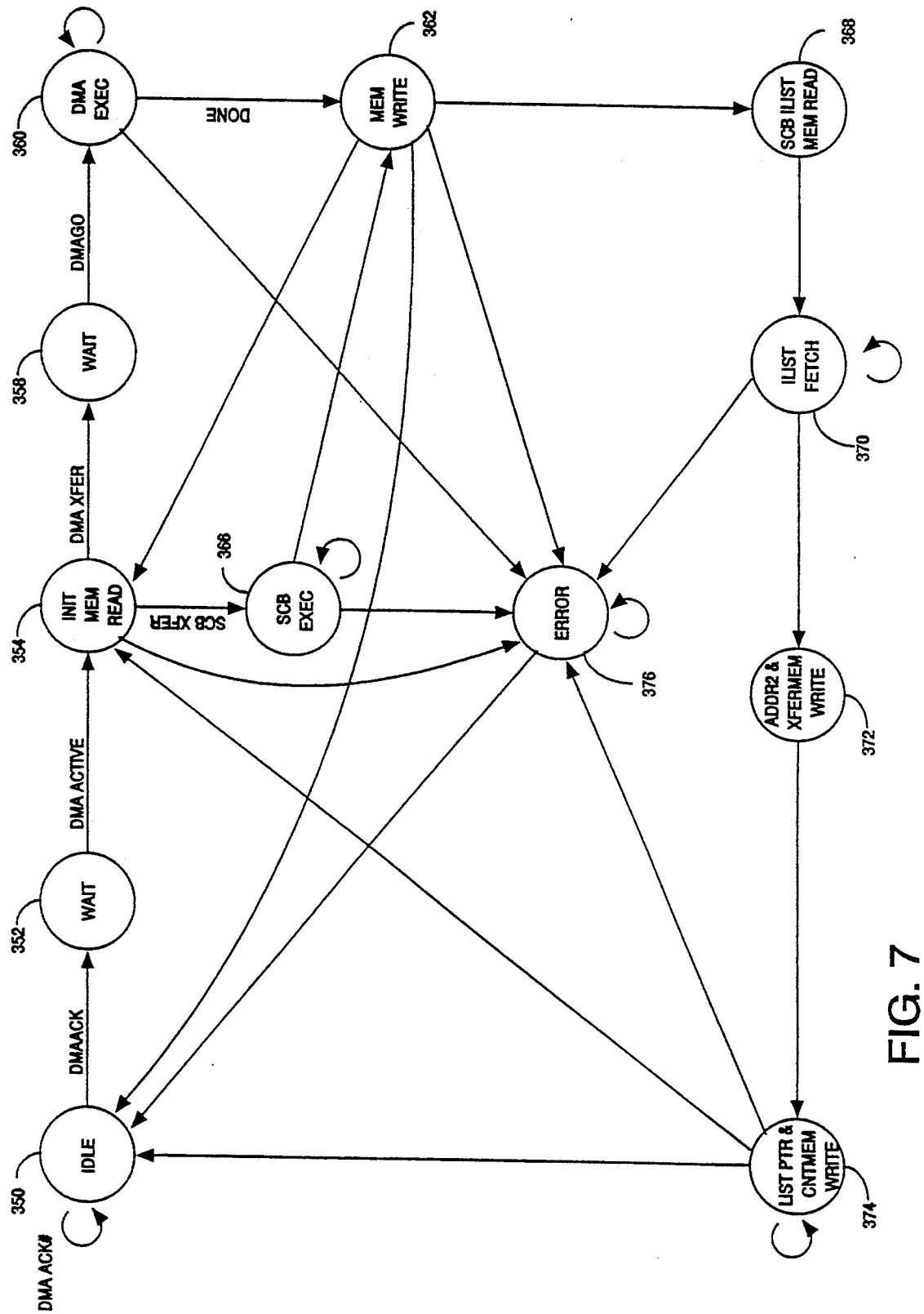
FIG. 7 is a state diagram of a supervisory state machine of the FIG. 6 state machine.

Referring to FIG. 7, supervisory state machine 302 cycles in idle state 350 until the DMAACK signal is activated. When the DMACCK signal is received, control is passed to wait state 352 which activates the DMA ACTIVE signal and allows control signals to settle prior to transfer to read memory state 354. Read memory state 354 fetches and reads DMA and SCB control information from DMA control backup circuit 110 and provides this information to control signal generator circuit 102. More specifically, the control information is loaded into mode controller 124, address generators 126, 128, transfer count controller 130 and byte enable generator 132. Additionally, FIFO information which is stored in FIFO backup memory 108 is loaded into FIFO register circuit 104 and FIFO controller 134. During read memory state 354, information which is stored in SCB controller 122 determines what type of transfer information is loaded into control signal generator circuit 102, e.g. whether a DMA transfer is to occur or whether an SCB transfer is to occur.

For a DMA transfer, control is passed to wait state 358 which activates the DMAGO signal. When the DMAGO signal is activated, control is passed to DMA execution state 360, via which control is passed to execution state machine 304. When DMA execution state machine 304 completes the transfer, the DONE signal is activated, control is returned to supervisory state machine 302, and control is passed to write state 362. Write state 362 stores the control information which is in the control circuits of control signal generator circuit 102 in DMA control backup circuit 110. Also, in write state 362, data information is transferred from FIFO register circuit 104 to FIFO backup memory 108. Additionally, in write state 362, the DMA ACTIVE signal is set inactive, which causes arbitration circuit 53 to set the DMAACK signal inactive and control is returned to idle state 350. Control remains with idle state 350 until the DMAACK signal is again activated by CACP 53.

For an SCB transfer, the control information, including an SCB pointer, is loaded from DMA control backup circuit 110 into control signal generator circuit 102 during initial memory read state 354. Control is passed from read state 354 to SCB execution state 366. During SCB execution state 366, SCB programming information is retrieved from system memory. SCB fetch controller 122 provides a fetch count which is used in retrieving the SCB information. SCB execution state 366 uses look ahead circuit 103 to generate pertinent control information based upon all possible bus sizes so that the SCB information may be retrieved as soon as the BSV signal goes active. The SCB information is placed temporarily in FIFO register circuit 104. After retrieving the information from SCB controller 122, control is passed to write state 362, where the SCB programming information is stored in DMA control backup circuit 110. After the SCB information is stored in DMA control backup circuit 110, control passes to memory read state 354 to initiate a DMA transfer. The SCB information which is retrieved is 16-bytes wide: four bytes indicating the mode of a transfer; four bytes indicating a first address (the first address is the I/O address for transfers which use an I/O device 19 or is the first memory address for memory to memory transfers); four bytes indicating a second address; and four bytes indicating a transfer count.

Supervisory state machine 302 is also capable of controlling data chaining operations. A data chaining operation is indicated by part of the mode information of the initial 16-byte SCB which is loaded during SCB execution state 366. Direct memory access transfers require data information to be stored in contiguous memory locations. Accordingly, if information is stored in non-contiguous blocks, then data chaining is used to effectuate a scatter or gather direct memory access transfer.

For data chaining operations, supervisory state machine 302 retrieves indirect list (ILIST) information in addition to the initial 16-byte SCB. The ILIST is a group of 8-byte ILIST SCB's; each ILIST SCB includes a four byte second address and a four byte transfer count. When a data chaining operation is indicated in the mode information of the SCB which is retrieved during SCB execution state 366, then after this SCB is written to memory during write state 362, control is transferred to SCB ILIST memory read state 368 during which the control information necessary to retrieve the ILIST information is loaded into control signal generator circuit 102. After this information is loaded, control is transferred to ILIST fetch state 370 during which the ILIST information is retrieved from system memory and placed temporarily in FIFO register circuit 104.

Control is then passed to write state 372 where the ILIST information is written to DMA control backup circuit 110. Control is then passed to write state 374 in which the ILIST pointer and the ILIST counter are stored in DMA control backup circuit 110. The ILIST pointer and counter are used to track which ILIST SCB of a particular data chain is to be used for the next DMA transfer. Control is then returned to idle state 350 if no DMA transfer is to occur or, if DMA controller 52 still has ownership of bus 18, control is passed to memory read state 354 to initiate a DMA transfer.

In addition to the operation states of supervisory state machine 302, supervisory state machine 302 also includes error state 376. Control transfers from certain operation states, e.g., memory read state 354, to error state 376 upon certain error conditions. A timeout condition is an example of an error state. Error state 376 performs certain completion tasks prior to returning to idle state 350, thus allowing DMA controller 52 to exit gracefully from error conditions.

Figure 8:
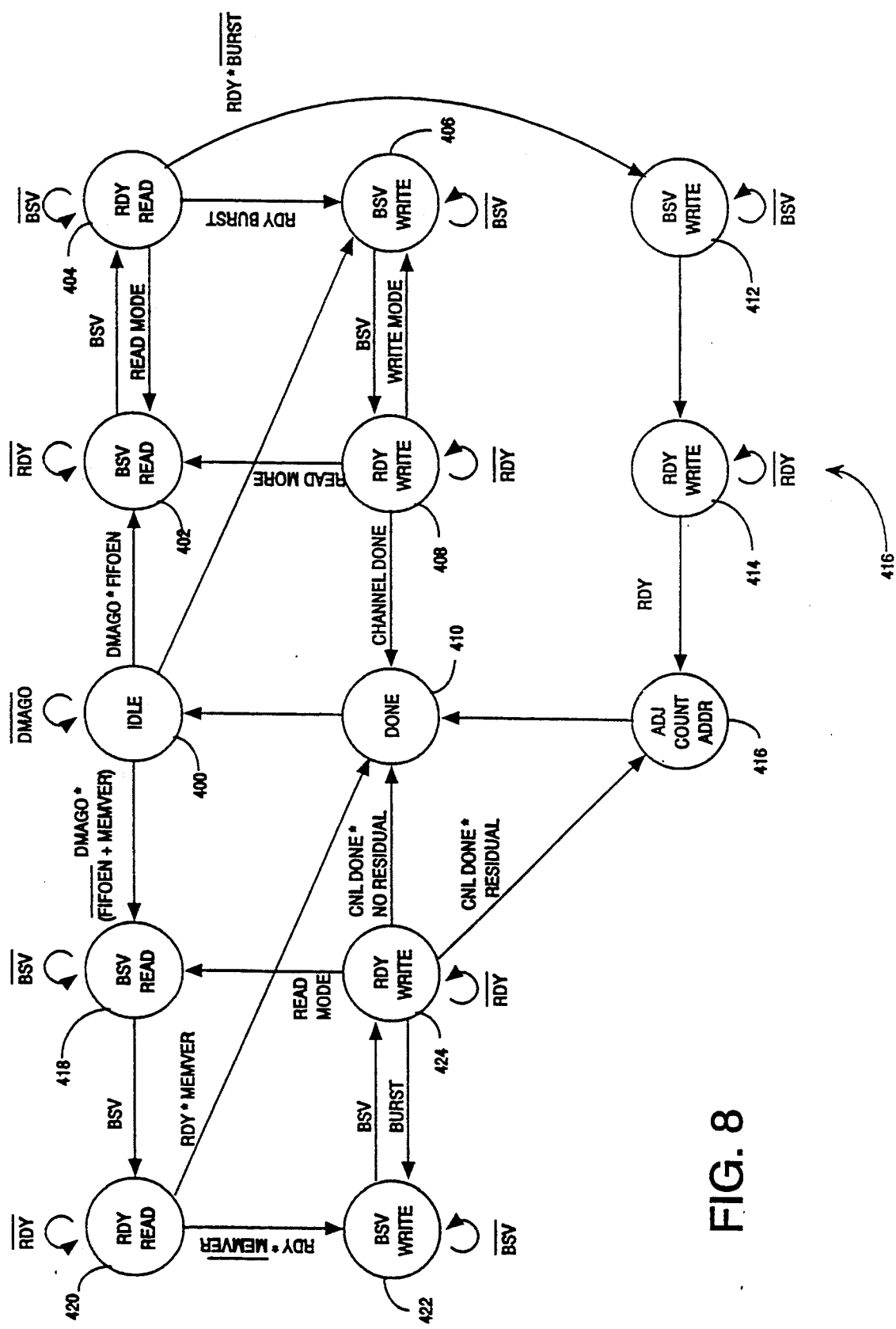
FIG. 8 is a state diagram of an executory state machine of the FIG. 6 state machine.

Referring to FIG. 8, DMA execution state machine 304 is organized in two portions, to the right of idle state 400 is a FIFO enabled portion and to the left of idle state 400 is a FIFO disabled portion. During operation of both portions, FIFO register circuit 104 is used as a holding mechanism. However, when operation of DMA execution state machine 304 is via the FIFO enabled portion, FIFO register circuit is filled with data information, e.g., when FIFO register circuit 104 is used with burst transfers or to optimize transfers between I/O devices 19 and the system memory. The operation of the different states of DMA execution state machine 304 also depends on the mode of the DMA transfer.

Prior to passing control to execution state machine 304, it remains in idle state 400. As long as the DMAGO signal remains inactive, control remains with idle state 400. When the DMAGO signal goes active, then control passes to either the FIFO enabled portion of DMA execution state machine 304 or to the FIFO disabled portion of DMA execution state machine 304 depending on the state of the FIFOEN signal. When the DMAGO signal is active, in conjunction with an active FIFOEN signal, control is passed to bus size valid read state 402.

For an I/O to memory transfer, as indicated by the mode information which is stored in mode controller 124, data information is read from the I/O device at the beginning of the cycle. While waiting for the BSV signal to go active, look ahead circuits 142, 144, 146 of look ahead circuit 103 are receiving information from the control circuits of control signal generator circuit 102 and generating control information which will be provided to the control circuits of control signal generator circuit 102 and execution state machine 304 based upon the width of the expansion devices as indicated by the BS16 and BS32 signals. When the BSV signal goes active, the control circuits of control signal generator circuit 102 are updated and control is passed to ready read state 404.

Control remains in ready read state 404 until the RDY signal goes active. When the RDY signal goes active, data information is latched from bus 18 into bus controller 101. One clock cycle later, this data information is provided to FIFO register circuit 104 and bus controller 101 is ready to latch more data information. During ready read state 404, the look ahead signals which are being generated by look ahead circuit 103 are monitored to determine whether any more data information is to be read. If more data is to be read, then control is returned to BSV read state 402 and the process is repeated. If there is no more data information to be read, then, for an I/O to memory transfer, control is passed to bus size valid write state 406.

During bus size valid write state 406, control information regarding the bus size is provided to the control information path of base portion 22. Bus size valid write state 406 assumes a 32-bit wide path and positions data from FIFO register circuit 104 to be provided to the data information path of base portion 22 in 32-bit segments unless FIFO register circuit 104 contains less than four bytes or the memory address is not aligned on a double word boundary. When the BSV signal goes active, control is passed to ready write state 408; when the RDY signal goes active, the data information is written out of FIFO register circuit 104 to memory in a burst. During ready write state 408, the look ahead signals which are being generated by look ahead circuit 103 are monitored to determine whether any more data information is to be written. If more data is to be written, then control is returned to BSV write state 406 and the process is repeated. Data information is written until FIFO register circuit 104 does not contain enough data to effectuate a transfer.

If after the data information is written from FIFO register circuit 104 and DMA controller 52 still owns bus 18, then control is passed to bus size valid state 402 and another read cycle is initiated. If the data transfer for the channel is complete, as indicated by an active CNL DONE signal, then control is passed to execution complete state 410. At execution complete state 410, the contents of the control circuits of control signal generator 102 are updated, the DONE signal is activated and control is passed back to idle state 400, and thus back to supervisory state machine 302. If more data is to be read from the I/O device, then control is returned to BSV write state 406 and the process is repeated.

For a memory to I/O transfer, which is indicated by the mode information which is stored in mode controller 124, the transfer is similar to that of an I/O to memory transfer. Executory state machine 304 uses the FIFO enabled portion and transfers control to bus size valid read state 402. Data information is read from the memory device at the beginning of the cycle. While waiting for the BSV signal to go active, look ahead circuits 142, 144, 146 of look ahead circuit 103 are receiving information from the control circuits of control signal generator circuit 102 and generating control information which will be provided to the control circuits of control signal generator circuit 102 and execution state machine 304 based upon the width of the memory device as indicated by the BS16 and BS32 signals. When the BSV signal goes active, the control circuits of control signal generator circuit 102 are updated and control is passed to ready read state 404. Control cycles between bus size valid read state 402 and ready read state 404 until FIFO register circuit 104 is filled with data information.

When the RDY signal goes active in conjunction with an active BURST signal, data information is read from memory and control is passed to bus size valid write state 406. During bus size valid write state 406, for a memory to I/O transfer, control information is generated by look ahead circuit 103 while waiting for bus size information from I/O bus 18. Accordingly, when the BSV signal goes active, control can be passed to ready write state 408 and the data information which is held in FIFO register circuit 104 can be written to the I/O device 19. Data information is written to the I/O device 19 until FIFO register circuit 104 is empty. FIFO register circuit 104 is empty if there is not enough data remaining in FIFO register circuit 104 to complete an I/O transfer. At this point control is either passed to bus size valid read state 402 or to execution completion state 410 as with an I/O to memory transfer.

If during ready read state 404, when the RDY signal goes active, the BURST signal is inactive, indicating that the I/O device 19 may receive only one transfer (e.g., because I/O device 19 is a non-bursting device), then control is passed to bus size valid write state 412. During bus size valid write state 412, the information necessary to transfer the data information is generated by look ahead circuit 103 so that when the BSV signal is activated, control may be transferred to ready write state 414. When the RDY signal goes active, the data information is transferred to the I/O device 19 and control is passed to adjust count and address state 416. During adjust count and address state 416, the count and address which is stored in DMA transfer controller 123 are adjusted to track the residual data information which is in FIFO register circuit 104, and control is passed to execution completion state 410.

For a memory to I/O transfer, when control is passed to executory state machine 304, FIFO register circuit 104 may have data information which was received during a previous transfer cycle. There may be information in FIFO register circuit 104, for example, because the I/O device 19 is a non-bursting device which cannot receive the entire contents of FIFO register circuit 104 in a single transfer cycle. Accordingly, during a subsequent transfer cycle, it is not necessary to reload FIFO register circuit 104 and control may transfer directly from idle state 400 to bus size valid write state 406.

If, when control is passed to idle state 400 of execution state machine 304, the DMAGO signal is active while either the FIFOEN signal is inactive, indicating that FIFO register circuit 104 is not enabled or the MEMVER signal is active, indicating that a memory verify operation is enabled then the FIFO disabled portion of execution state machine 304 is used and control is passed to bus size valid read state 418. During bus size valid state 418, look ahead circuit 103 generates the control information necessary to effectuate a transfer. When the BSV signal goes active, this control information is loaded into the control circuits of control signal generator circuit 102 and control is passed to ready read state 420. Control remains with ready read state 420 while the RDY signal remains inactive. When the RDY signal goes active then, if the MEMVER signal is active, control is transferred to execution complete state 410. The memory verify operation is used to test transfer cycles without testing data integrity.

If the MEMVER signal is inactive, control is passed to bus size valid write state 422. During bus size valid write state 422, look ahead circuit 103 generates the control information necessary to write the data information which is held in FIFO register circuit 104. When the BSV signal goes active, then control is passed to ready write state 424. While the RDY signal is inactive, control remains with ready write state 424. If, when the RDY signal goes active, the BURST signal is active and at least four bytes remain in FIFO register circuit 104, then control is passed back to bus size valid write state 422 and more data information is written. If the CNL DONE signal is active in conjunction with the NO RESIDUAL signal then control is passed to execution complete state 410. If the CNL DONE signal is active in conjunction with the RESIDUAL signal, then control is passed to adjust count state 416. The address and count information of DMA transfer controller 123 is adjusted and control is passed to execution complete state 410.

In addition to the transitions that are shown, every state which monitors the RDY signal, e.g., ready read state 404, has a path to complete state 410 when the TIMEOUT signal is active. In this way, when an error condition occurs, a direct path is provided via which error state 376 of supervisory state machine 302 may be reached.

Referring again to FIGS. 1, 3 and 4, in operation, when DMA controller 52 initiates any type of transfer, information which is to be transferred is read from a device, e.g., system memory 16, 17, and written into FIFO register circuit 104. The information which is held in FIFO register circuit 104 is then read from FIFO register circuit 104 and written to another device, e.g., an I/O device 19. Thus, a system read produces a FIFO write and a FIFO read produces a system write. Data information which is held in FIFO register circuit 104 is tracked via a read pointer and a write pointer which are generated by read pointer circuit 220 and write pointer circuit 222. The read pointer identifies where the first byte of data which is held in FIFO register circuit 104 is located, i.e., in which cell this information is held. The write pointer identifies the location where the next byte of data is written in FIFO register circuit 104. For the first byte of data which is written to FIFO register circuit 104, these two pointers are the same. For each subsequent byte of data information which is written to FIFO register circuit 104, the write pointer is incremented; the read pointer remains the same. In this way, it is possible to determine to which cell to write the next byte of data information. In addition to incrementing the write pointer, when data is written into a cell, the BYTE VALID signal for that cell is set active, thus indicating that valid data information is stored in the cell. When data information is read from FIFO register circuit 104, the read pointer is incremented with each byte of data which is read. The read and write pointers are stored in FIFO backup memory 108 along with the data information from the buffer cells.

Supervisory state machine 302 also determines whether a transfer is an initial transfer cycle, i.e., the first transfer which uses FIFO register circuit 104. If a transfer is an initial transfer, then data information is read directly from a source device rather than loading data information from FIFO backup memory 108.

If a transfer is not an initial transfer, as determined by supervisory state machine 302, then register circuit 104 is loaded from FIFO backup memory 108 prior to reading information from the source device. The BYTE VALID signals, which are stored along with the data information when FIFO register circuit 104 is backed up, are used to determine which buffer cells have data information stored in them after the data information is retrieved by FIFO register circuit 104.

For the first write to FIFO register circuit 104, the first byte of data information is written to initial stage cell 208a. The next byte of data is written to initial stage cell 208b and so on. After all four initial stage cells are written to, then the next byte of data information is written to intermediate stage cell 206a. Data may be written until all of the buffer cells of FIFO register circuit 104 contain data information, thus 20-bytes of data may be written to FIFO register circuit 104 without reading any information from it. With each byte that is written, the write pointer is incremented so that when the contents of FIFO register circuit 104 are retrieved from FIFO backup memory 108, data can be written to the next available cell. Because the data information is written directly to initial stage cells 208 (i.e., data information is loaded into the front end of the FIFO register), this data information is immediately available to be read from FIFO register circuit 104. Accordingly, a FIFO write and a FIFO read can occur in subsequent cycles.

The read pointer is used to track where the initial read should occur, e.g., for the initial read, the read pointer points to initial stage cell 208a. With each read, the read pointer is incremented. Accordingly, if during the initial cycle, two bytes were read and then the contents of FIFO register circuit 104 were stored in FIFO backup memory 108, then read pointer would point to initial stage cell 208c when FIFO register circuit 104 is reloaded from FIFO backup memory 108.

Data out steering controller 228 determines which multiplexer of output steering multiplexers 210 pass which bytes of data. For example, for an initial read, multiplexer 210 passes the data information which is received from initial stage cell 208a. For a read where read pointer is pointing to initial stage cell 208c, multiplexer 210 passes the data information which is received from initial stage cell 208c.

Referring again to FIG. 5, byte valid control circuit 250 determines the state of the BYTE VALID signal, and thus controls whether the information which is stored in a buffer cell is interpreted as valid information. In this way, the byte valid control circuits control shifting data information across rows of FIFO register circuit 104.

For an initial stage cell 208, when the BYTE VALID signal is inactive and a write operation is performed, then the next value of the BYTE VALID signal is active. When the BYTE VALID signal is active and a write operation is performed, then the next value of the BYTE VALID signal is active. When the BYTE VALID signal is inactive and a read operation is performed, then the next value of the BYTE VALID signal is inactive. When the BYTE VALID signal is active and a read operation is performed, then the next value of the BYTE VALID signal is BV(I−1).

For an intermediate stage cell 206, when the BYTE VALID signal is inactive and a write operation is performed, then the next value of the BYTE VALID signal is the BV(I+1) value. When the BYTE VALID signal is active and a write operation is performed, then the next value of the BYTE VALID signal is active. When the BYTE VALID signal is inactive and a read operation is performed, then the next value of the BYTE VALID signal is inactive. When the BYTE VALID signal is active and a read operation is performed, then the next value of the BYTE VALID signal is BV(I−1).

For a final stage cell 204, when the BYTE VALID signal is inactive and a write operation is performed, then the next value of the BYTE VALID signal is BV(I+1). When the BYTE VALID signal is active and a write operation is performed, then the next value of the BYTE VALID signal is active. When the BYTE VALID signal is inactive and a read operation is performed, then the next value of the BYTE VALID signal is inactive. When the BYTE VALID signal is active and a read operation is performed, then the next value of the BYTE VALID signal is inactive.

Figure 9:
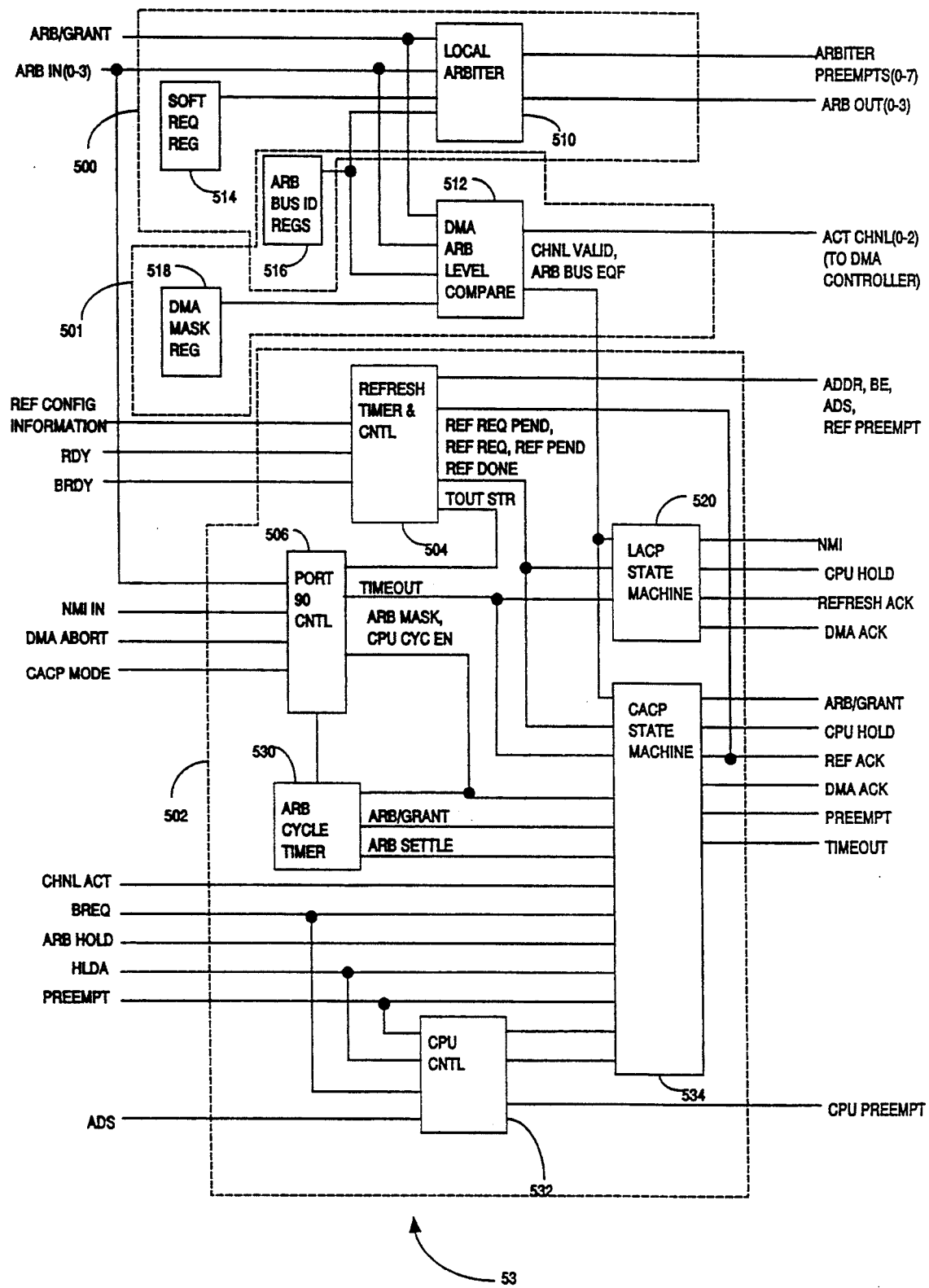
FIG. 9 is a schematic, block diagram of the central arbitration control point circuit of the computer system of FIG. 1.

Referring to FIG. 9, CACP circuit 53 includes soft request arbiter portion 500, DMA channel selection portion 501, and system control portion 502. Soft request arbiter portion 500 includes local arbiter circuit 510, soft request register 514 and arbitration bus identification register 516. DMA channel selection portion 501 includes DMA arbitration level compare circuit 512, DMA mask register 518 and shares arbitration bus identification register 516 with soft request arbiter portion 500. System control portion 502 includes refresh timer and control circuit 504, port 90 control circuit 506, local arbitration control point (LACP) state machine 520, central arbitration control point (CACP) state machine 534, arbitration cycle timer 530, and CPU arbitration control circuit 532.

Soft request arbiter portion 500 provides arbitration capabilities for DMA controller 52. In this way, respective channels of DMA controller 52 may arbitrate for control of I/O bus 18 along with any expansion devices 19 which are arbitrating for control of I/O bus 18. Thus local arbiter circuit 510 performs a function which is local, i.e., a function which is directly related to DMA controller 52. By using arbitration bus identification register 516, local arbiter circuit 510 can be programmed to arbitrate on any arbitration priority level; thus providing a virtual arbitration capability for DMA controller 52. DMA channel selection portion 501 provides the conversion from the virtual arbitration level appearing on the ARB IN(0-3) signals to a DMA channel number.

System control portion 502 can operate using either CACP state machine 534 or LACP state machine 520. When operating in a CACP mode, system control portion 502 controls the actual arbitration timing and access of all devices which are competing for access to I/O bus 18. In the CACP mode, system control portion 502 functions as the central controller of MICRO CHANNEL arbitration for computer system 10. When operating in a LACP mode, system control portion 502 allows DMA controller 52 to function under the control of a remote CACP. Using LACP mode allows multiple DMA controller 52 functions to exist on base portion 22 or I/O bus 18.

Refresh timer and control circuit 504 generates the timing and control information necessary to refresh any memory which is used in the computer system. More specifically, refresh timer and control circuit 504 generates a refresh request control signal (REF REQ) which is a refresh request pulse that is dependent upon the refresh requirements of the memory which is used in the computer system (e.g., every 15.6 microseconds for conventional dynamic random access memory). Upon generating the first refresh request control signal, refresh timer and control circuit 504 generates a refresh preempt signal (REF PREEMPT). The PREEMPT signals which are generated by various devices indicate that the device which currently has ownership of the bus has a preselected amount of time (e.g. 7.8 microseconds) to relinquish control of the bus so that another arbitration cycle can commence. The refresh operation is performed during the ensuing arbitration cycle. In addition to the REF PREEMPT signal, refresh timer and control circuit 504 generates and receives a plurality of refresh controls signals.

More specifically, refresh timer and control circuit 504 provides a refresh complete signal (REF DONE), which indicates that the refresh cycle or cycles are complete, a refresh request pending signal (REF REQ PEND), which indicates that refresh of memory has been requested or is pending, a refresh pending signal (REF PEND), which indicates that a refresh request is pending and a bus timeout strobe signal (TOUT STR), which indicates when three refresh requests have gone unserviced due to the current owner of I/O bus 18 ignoring the REF PREEMPT signal and not releasing the bus. The refresh control signals also include a 30 bit address signal (A(0-31)) and a four bit byte enable signals (BE(0-3)), which indicate which memory locations to refresh, an address strobe signal (ADS), which indicates when to sample the address signal and a refresh indication signal (REFRESH), which indicates that a refresh operation is being performed. Refresh timer and control circuit 504 also generates the I/O bus control signals MIO and R/W. Refresh timer and control circuit 504 receives refresh configuration information which is stored in a register during power on of computer system 10, a refresh acknowledge signal (REF ACK) signal, which is provided by CACP state machine 534 to indicate that it has granted refresh access to the bus and bus ready signals (RDY, BRDY) which indicate that a respective bus has completed its refresh cycles. The RDY signal is provided by bus interface unit 54 to indicate that I/O bus 18 has completed its refresh operation and the BRDY signal is provided by memory controller 50 to indicate that the local bus has completed its refresh operation.

Port 90 control circuit 506 stores arbitration control information which is written to CACP 53 so that this control information may be used by LACP state machine 520 and CACP state machine 534. Selection of either CACP state machine 520 or CACP state machine 534 is based upon the state of an arbitration mode signal (CACP MODE) which is set during power-up of the computer system. The arbitration control information is used in the overall control of CACP 53. The arbitration control information includes arbitration level information which indicates the arbitration level during the last grant of I/O bus 18. This arbitration level information indicates which device last had control of I/O bus 18 and thus can be used to determine which device caused an error condition if one should occur. The arbitration control information also includes CPU cycle during arbitration enable information which indicates whether the CPU, in addition to refresh, may access I/O bus 18 during the arbitration cycle time. Port 90 control circuit provides a CPU cycle enabled signal (CPU CYC EN) based upon the CPU cycle during arbitration enable information. The arbitration control information also includes mask arbitration information which forces I/O bus 18 to remain in the arbitration state. The mask arbitration information is used during power on or other times in which access to I/O bus 18 should be restricted to the CPU and to refresh. Port 90 control circuit provides an arbitration masked signal (ARB MASK) which indicates whether arbitration is masked or enabled. The arbitration control information also includes double arbitration cycle length information which indicates whether an arbitration cycle time may be lengthened.

Port 90 control circuit 506 receives error information from refresh timer and control circuit 504 and supervisory state machine 302. Port 90 control circuit 506 receives the TOUT SRB signal from refresh timer and control circuit 504. Port 90 control circuit also receives from DMA controller 52, A DMA execution abort (DMA ABORT) signal whenever an error is detected while DMA control state machine 120 is active. Upon receiving either an active TOUT STR or DMA ABORT signal, port 90 control circuit 506 generates an active bus timeout (TIMEOUT) signal. Additionally, when the TOUT STR signal or the DMA ABORT signal goes active, CACP state machine 534 immediately enters a masked arbitration state, which is indicated by an active masked arbitration signal (ARB MASK). An active ARB MASK signal causes CACP 53 to enter the arbitration state, which forces all expansion devices on I/O bus 18 to release the bus.

The TIMEOUT signal is received by LACP state machine 520, CACP state machine, and DMA controller 52. Upon receiving an active TIMEOUT signal: DMA control state machine completes the current bus cycle and gracefully returns control to arbitration state machine 300; CACP state machine passes the TIMEOUT signal to base portion 22 and processor portion 20 to alert the system that an error has occurred Alternately, LACP state machine 520 generates a Non Maskable Interrupt (NMI OUT) signal to alert CACP state machine 520, base 22 and processor 20 that an error has occurred.

Local arbiter circuit 510 is an 8-channel local arbiter which independently arbitrates for ownership of I/O bus 18 for the eight channels of DMA controller 52. Local arbiter circuit 510 receives a soft request signal from soft request register 514, which is an 8-bit register, one bit for each channel of DMA controller 52. The soft request signal indicates for which DMA channels local arbiter circuit 510 should initiate arbitration. Local arbiter circuit 510 also receives DMA channel arbitration identification signals from arbitration bus identification register circuit 526. Arbitration bus identification register circuit 526 includes eight 4-bit registers; each register holds a 4-bit arbitration identification signal (ARB ID) which corresponds to one of the eight channels of DMA controller 52. The arbitration identification signal is an arbitration level definition for the respective DMA channel. Accordingly, the different DMA channels may have different arbitration priorities. By providing local arbiter circuit 510 with a channel corresponding to each channel of DMA controller 52, it is possible for each channel of DMA controller 52 to arbitrate for ownership of I/O bus 18.

Based upon the soft request signal and the arbitration identification signals, local arbiter circuit 510 accesses I/O bus 18 and arbitrates for ownership of the bus along with any other devices which are requesting ownership of I/O bus 18. The arbitration is in accordance with conventional arbitration for a MICRO CHANNEL type I/O bus in which a four bit arbitration signal (ARB IN) indicates the arbitration level which receives ownership of the bus. Local arbiter circuit 510 is used to arbitrate for I/O bus 18 for memory to memory type DMA transfers or for DMA transfers which are to or from an I/O device which does not have a local arbiter. For transfers to or from an I/O device which does have a local arbiter, the I/O device arbitrates for ownership of the bus.

More than one DMA channel may have the same arbitration priority. If so, then DMA arbitration level compare circuit 512 is used to determine which channel may access the I/O bus first. DMA arbitration level compare circuit 512 first compares the ARB IN signal to the ARB ID signals for all eight channels to determine which channels have the same arbitration priority as the ARB IN signal. DMA arbitration level compare circuit 512 next compares the mask signals from DMA mask register 518 to the results of the comparison between the ARB IN signal and the ARB ID's. The mask signals indicate whether a respective DMA channel can be enabled. The eligible DMA channels are then prioritized by DMA arbitration level compare circuit 512; the channel which is granted access to the bus is identified by its respective active channel signal (ACT CHNL), which is provided to DMA controller 52. Additionally, DMA channel valid signal (CHNL VALID), which indicates that a DMA channel won arbitration for I/O bus 18, is provided to LACP state machine 520 and to CACP state machine 534. When the CHNL VALID signal is activated, CACP state machine 534 activates the DMA ACK signal. When the DMA ACK signal goes active, then DMA controller 52 looks to the ACT CHNL signal to determine which channel is enabled to execute a transfer. If a DMA channel does not win the bus, then when the GRANT signal goes active, the CHNL VALID signal remains inactive. DMA arbitration level compare circuit 512 also provides a CPU arbitration indication signal (ARB BUS EQF) which indicates that processor circuit 30 won ownership of I/O bus 18 during arbitration.

Arbitration cycle timer 530 of system control portion 502 receives the ARB/GRANT signal and generates an arbitration cycle signal (ARB SETTLE) which indicates how much time an arbitration cycle can take on the bus. Arbitration cycle timer 530 starts timing the arbitration cycle when the ARB/GRANT signal goes to the arbitration state. The ARB SETTLE signal is provided to CACP state machine 534.

CPU control circuit 532 of central arbitration portion 502 controls the access to I/O bus 18 of the central processor of computer system 10. CPU control circuit 532 receives a synchronized CPU hold acknowledge signal (HLDA), which indicates that the CPU acknowledges owning I/O bus 18, a bus request signal (BREQ), which indicates that the CPU wants to request ownership of I/O bus 18, the PREEMPT signal, and an address strobe signal (ADS), which indicates when the CPU is executing a cycle on I/O bus 18. CPU control circuit 532 also receives a hold signal (HOLD) and the ARB/GRANT signal from CACP state machine 534. CPU control circuit 532 also receives timer control signals such as an arbitration cycle complete indication signal (ARB DONE), a grant cycle complete indication signal (GNT DONE), a timer enable signal (CPU BURST EN), which enables the timers of CPU control circuit 532, a CPU idle check signal (CPU IDLE CHK), which indicates that the idle timer of CPU control circuit 532 may be checked, and a CPU cycle enable change indication signal (CHANGE CPU CYC EN), which indicates if the CPU CYC EN signal has changed as well as a run count signal (RCNT) and an idle count signal (ICNT). CPU control circuit 532 provides to I/O bus 18 a CPU preempt signal (CPU PREEMPT), which, as with the REF PREEMPT signal, requests that an arbitration cycle be initiated. CPU control circuit 532 also provides a CPU access timer signal (TIMER TUP), which indicates when the CPU's bus ownership time has expired as well as a processor burst signal (CPU BURST), which indicates that the CPU fairly arbitrated for I/O bus 18.

Figure 10:
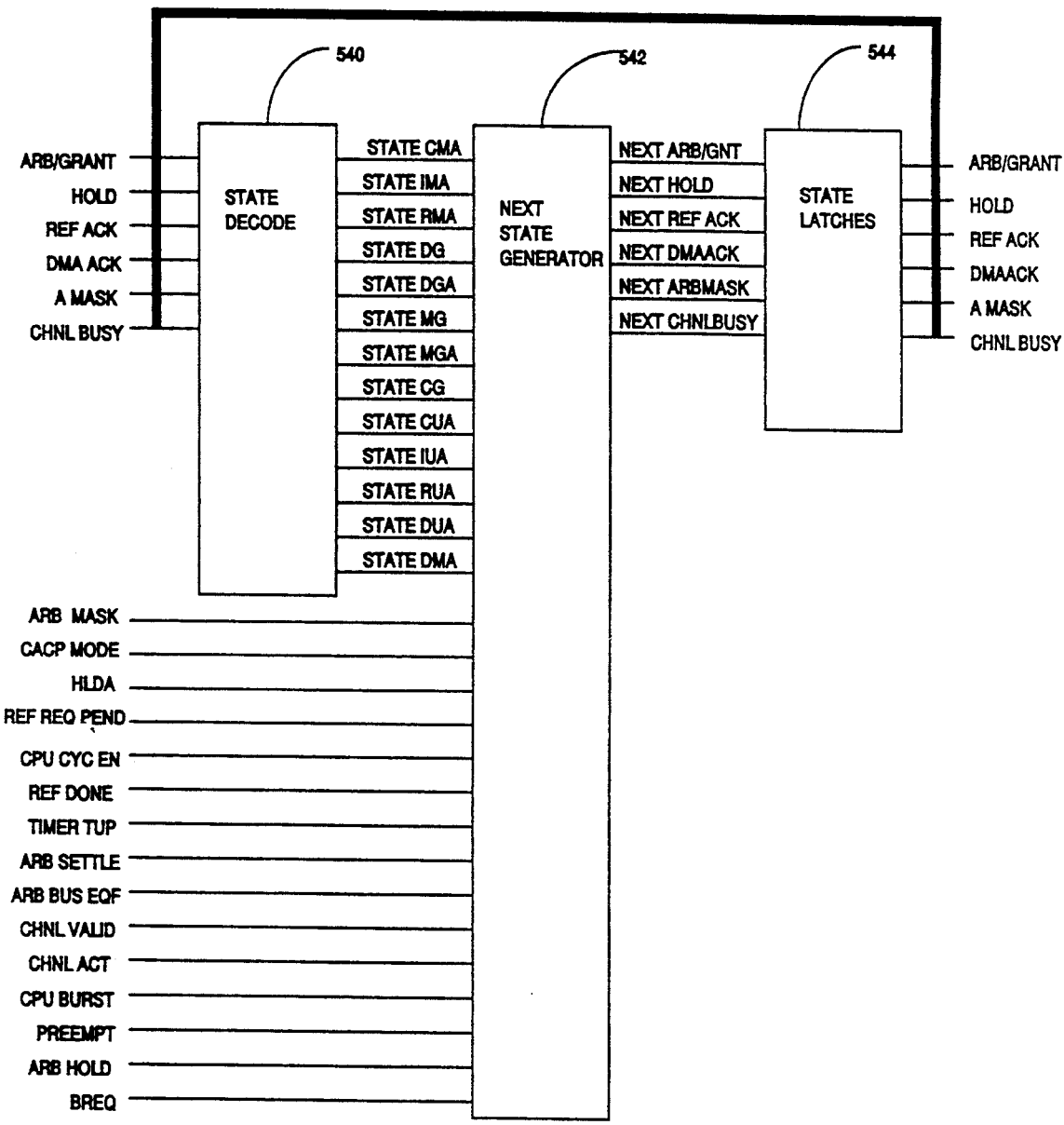
FIG. 10 is a schematic-block diagram of the CACP state machine of FIG. 9.

Referring to FIG. 10, CACP state machine 534 includes state decode circuit 540, next state generator circuit 542 and state latches 544. State decode circuit 540 receives the present ARB GRANT signal, the CPU HOLD signal, the REFRESH ACK signal, the DMA ACK signal, an arbitration masked during state (A MASK) signal, which identifies whether the present state is a masked arbitration state, and a channel busy (CHNL BUSY) signal, which indicates that I/O bus 18 is in use, from state latches 544 and provides state indication signals to next state generator circuit 542. The state indication signals indicate the present state of state machine 534. In addition to the state indication signals, next state generator circuit 542 also receives CACP control signals, CACP MODE, HLDA, REF REQ PEND, CPU CYC EN, REF DONE, TIMER TUP, ARB SETTLE, ARB BUS EQF, CHNL VALID. next state generator circuit also receives an I/O bus active signal (CHNL ACT), which indicates when I/O bus 18 is active, a synchronized arbitration hold signal (ARB HOLD), which requests the arbiter not to reallocate I/O bus 18, and the PREEMPT signal from I/O bus 18. The ARB HOLD signal is used either to force CACP state machine 534 into an idle state when the current controller device releases I/O bus 18 or to lock CACP state machine 534 in an idle state so that I/O bus 18 cannot be reallocated to a new controller device. Once CACP state machine 534 is in an idle state, there is no indication of which controller device previously owned I/O bus 18; if executing transfers on behalf of the controller device, the device which is setting the ARB HOLD signal active (e.g., bus interface unit 54) tracks which controller device owned the bus at the time the ARB HOLD signal was driven active. Next state generator circuit 542 provides the next ARB GRANT signal, CPU HOLD signal, REFRESH ACK signal, DMA ACK signal, A MASK signal and CHNL BUSY signal to state latches 544. State latches provide the next states of these signals as outputs when latched by the system CLOCK signal; i.e., the state of CACP state machine 534 is reevaluated every system clock cycle.

Figure 11:
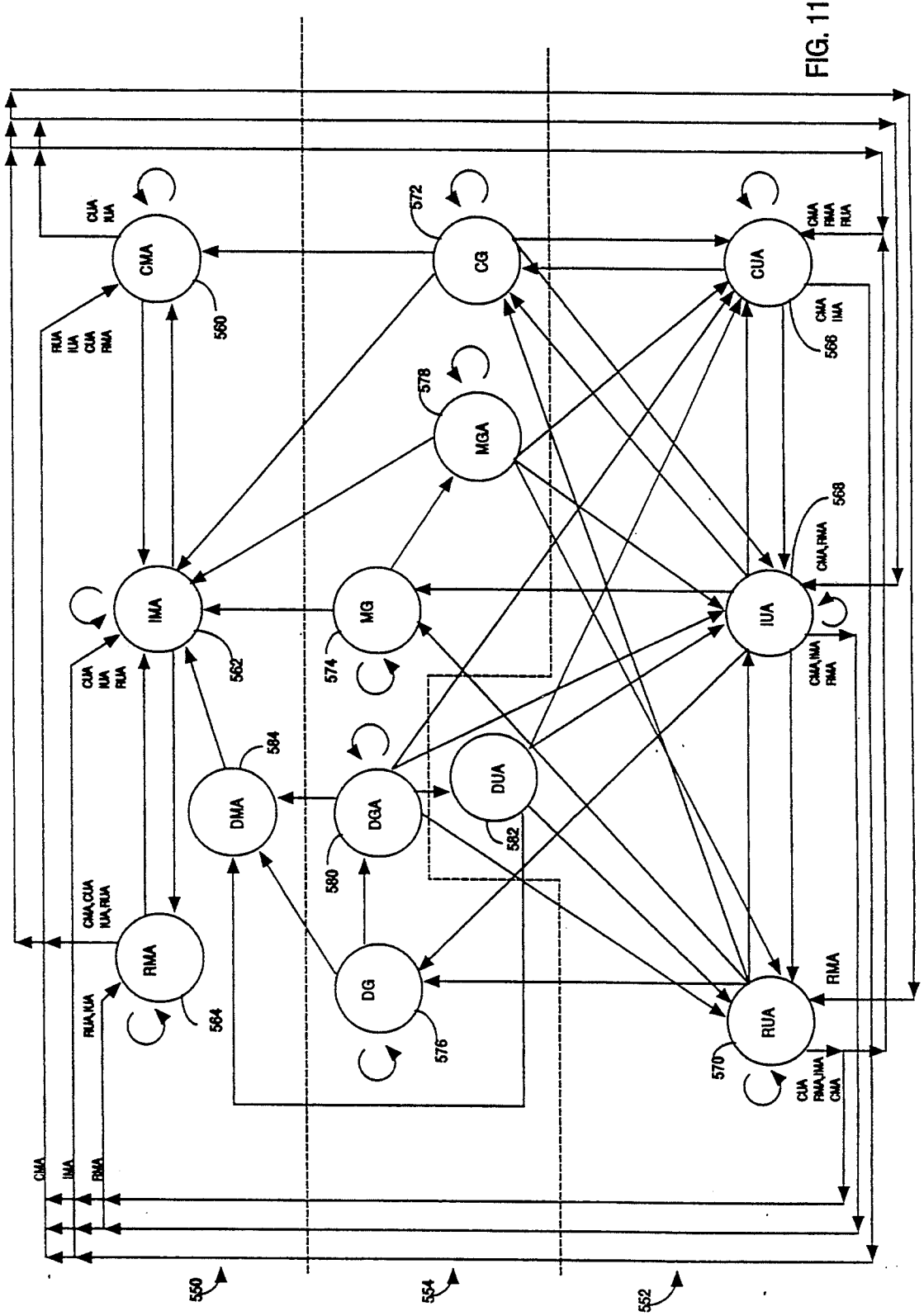
FIG. 11 is a state diagram of the operation of the CACP state machine of the FIG. 9 CACP circuit.

Referring to FIG. 11, CACP state machine 534 includes masked arbitration portion 550, unmasked arbitration portion 552 and grant portion 554. Arbitration control state machine uses CACP state machine 534 when, upon power-on, the CACP MODE signal is active; control remains with CACP state machine 534 unless the configuration of computer system 10 is changed. When computer system 10 is powered-on or reset, the ARB MASK signal, which is stored in port 90 control circuit 506, is activated; when CACP state machine receives an active ARB MASK signal, control remains in masked arbitration portion 550. When the ARB MASK signal is inactive, control of CACP state machine 534 shifts to unmasked arbitration portion 552. During normal operation of computer system 10, the ARB MASK signal is set inactive and control cycles between unmasked arbitration portion 552 and grant portion 554 based upon the state of the ARB/GRANT signal. I.e., when the ARB/GRANT signal is in the arbitration state, control is with unmasked arbitration portion 552; when the ARB/GRANT signal is in the grant state, control is with grant portion 554.

Operation of CACP state machine 534 starts in CPU masked arbitration (CMA) state 560. While in CMA state 560, the ARB/GRANT signal is in the arbitration state, the CPU HOLD signal is inactive, the REFRESH ACK signal is inactive, the DMA ACK is inactive and the A MASK signal is active. While in CMA state 560, next state generator circuit 542 monitors the CACP MODE signal, the ARB MASK signal, the synchronized HLDA signal, the REF REQ PEND signal and the CPU CYC EN signal to determine the next state of CACP state machine 534. The next state is also CMA state 560 if the CACP MODE signal is inactive. The next state is also CMA state 560 if the CACP signal is active, the ARB MASK signal is active, the synchronized HLDA signal is inactive and the REF REQ PEND signal is inactive. The next state is also CMA state 560 while the CACP MODE signal is active, the ARB MASK signal is active and the synchronized HLDA signal is active. The next state is idle masked arbitration state 562 when the CACP MODE signal is active, the ARB MASK signal is active, the synchronized HLDA signal is inactive and the REF REQ PEND signal is active.

While in IMA state 562, the ARB/GRANT signal is in the arbitration state, the CPU HOLD signal is active, the REFRESH ACK signal is inactive, the DMA ACK is inactive and the A MASK signal is active. While in IMA state 562, next state generator circuit 542 monitors the synchronized ARB HOLD signal, the REF REQ PEND signal and the synchronized HLDA signal to determine the next state of CACP state machine 534. The next state is also IMA state 562 if the synchronized ARB HOLD signal is inactive, the REF REQ PEND signal is inactive and the synchronized HLDA signal is inactive. The next state is also IMA state 562 if the synchronized ARB HOLD signal is inactive, the REF REQ PEND signal is inactive and the synchronized HLDA signal is inactive. The next state is also IMA state 562 if the synchronized ARB HOLD signal is active; this condition insures that CACP state machine 534 remains in an idle state and thus that CACP controller does not reallocate I/O bus 18 to a new controller device. The next state returns to CMA state 560 if the synchronized ARB HOLD signal is inactive, the REF REQ PEND signal is inactive and the synchronized HLDA signal is active. The next state is refresh masked arbitration (RMA) state 564 if the synchronized ARB HOLD signal is inactive, the REF REQ PEND signal is active and the synchronized HLDA signal is active.

While in RMA state 564, the ARB/GRANT signal is in the arbitration state, the CPU HOLD signal is active, the REFRESH ACK signal is active, the DMA ACK signal is inactive and the A MASK signal is active. During RMA state 564, next state generator circuit 542 monitors the ARB MASK signal, the REF DONE, the REF PEND signal, the CPU CYC EN signal and the synchronized ARB HOLD signal to determine the next state of CACP state machine 534. The next state is also RMA state 564 if the ARB MASK signal is active and the REF DONE signal is inactive. The next state returns to IMA state 562 if the ARB MASK signal is active, the REF DONE signal is active and the REF PEND signal is active. The next state is also IMA state 562 if the ARB MASK signal is active, the REF DONE signal is active the REF PEND signal is inactive and the synchronized ARB HOLD signal is active. The transition from RMA state 564 to IMA state 562 locks CACP state machine 534 in an idle state to allow a refresh device to steal cycles between the end of a refresh function and the allocation of I/O bus 18 to another controller device; this transition also allows a second arbiter to lock a first arbiter in an idle state for systems which include more than one I/O bus and arbiter. The next state is CMA state 560 if the ARB MASK signal is active, the REF DONE signal is active the REF PEND signal is inactive and the synchronized ARB HOLD signal is inactive.

Control cycles between CMA state 560, IMA state 562 and RMA state 564 during initialization of the computer system. Because exiting state 560 requires communication with the CPU, any transition between CMA state 560 and RMA state 564 passes though IMA state 562 to guarantee that the HOLD, HLDA handshake occurs between CACP 53 and processor 30 and thus that processor 30 has returned control of I/O bus 18 to CACP 53. However, control can directly shift from RMA state 564 to CMA state 560 because refresh is an internal arbitration function and there is no handshake requirement after the refresh of memory is complete. When control shifts from RMA state 564 to IMA state 562, another refresh is pending as indicated by the REF PEND signal.

After the initialization is complete, then the ARB MASK signal from port 90 register 506 is set inactive and control shifts from masked arbitration portion 550 to unmasked arbitration portion 552. More specifically, if control is with CMA state 560 and the CACP MODE signal is active, the ARB MASK signal is inactive, the synchronized HLDA signal is inactive, the REF REQ PEND signal is inactive and the CPU CYC EN signal is active, then the next state is CPU unmasked arbitration state (CUA) 566. Alternately, if, when the present state is CMA state 560, the CACP MODE signal is active, the ARB MASK signal is inactive and the synchronized HLDA signal is active, then the next state is also CUA state 566. If the present state is CMA state 560 and the CACP MODE signal is active, the ARB MASK signal is inactive, the synchronized HLDA signal is inactive, the REF REQ PEND signal is inactive and the CPU CYC EN signal is active, then the next state is idle unmasked arbitration (IUA) 568. If the present state is CMA state 560 and the CACP MODE signal is active, the ARB MASK signal is inactive, the synchronized HLDA signal is inactive and the REF REQ PEND signal is active, then the next state is also IUA state 568.

Because the purpose of the state is completed when exiting IMA state 562, the next state must be CMA state 560 prior to CUA state 566 or RMA state 564 prior to RUA state 570. However, because a refresh may be pending when exiting CMA state 560, the next state may be IUA state 568.

If the present state is RMA state 564 and the ARB MASK signal goes inactive and the REF DONE signal is inactive then the next state is refresh unmasked arbitration (RUA) state 570. If the present state is RMA state 564 and the ARB MASK signal goes inactive, the REF DONE signal is active, the REF PEND signal is inactive and the CPU CYC EN signal is inactive, then the next state is IUA state 568. If the present state is RMA state 564 and the ARB MASK signal is inactive, the REF DONE signal is active and the REF PEND signal is active, then the next state is IUA state 568. If the present state is RMA state 564 and the ARB MASK signal is inactive, the REF DONE signal is active, the REF PEND signal is inactive, the CPU CYC EN signal is active and the synchronized ARB HOLD signal is active, then the next state is IUA state 568. The transition from RMA state 564 to IUA state 568 locks CACP state machine 534 in an idle state to allow a refresh device to steal cycles between the end of a refresh function and the allocation of I/O bus 18 to another controller device; this transition also allows a second arbiter to lock a first arbiter in an idle state for systems which include more than one I/O bus and arbiter. If the present state is RMA state 564 and the ARB MASK signal is inactive, the REF DONE signal is active, the REF PEND signal is inactive, the CPU CYC EN signal is active and the synchronized ARB HOLD signal is inactive, then the next state is CUA state 568.

While in CUA state 566, the ARB/GRANT signal is in the arbitration state, the CPU HOLD signal is inactive, the REFRESH ACK signal is inactive, the DMA ACK signal is inactive and the ARB MASK signal is inactive. During CUA state 566, next state generator circuit 542 monitors the ARB MASK signal, the synchronized HLDA signal, the REF REQ PEND signal, the TIMER TUP signal, the ARB SETTLE signal the ARB BUS EQF signal and the synchronized BREQ signal to determine the next state of CACP state machine 534. When CUA state 566 is the present state and the ARB MASK signal is inactive, the synchronized HLDA signal is inactive, the REF REQ PEND signal is inactive, the TIMER TUP signal is inactive and the ARB SETTLE signal is inactive, then the next state is also CUA state 566. Also, when CUA state 566 is the present state and the ARB MASK signal is inactive, the synchronized HLDA signal is inactive, the REF REQ PEND signal is inactive, the TIMER TUP signal is inactive and the ARB SETTLE signal is active and the ARB BUS EQF signal is inactive, then the next state is also CUA state 566. Also, when CUA state 566 is the present state, and the ARB MASK signal is inactive and the synchronized HLDA signal is active, then the next state is also CUA state 566. Also, when CUA state 566 is the present state and the ARB MASK signal is inactive, the synchronized HLDA signal is inactive, the REF REQ PEND signal is inactive, the TIMER TUP signal is active, the ARB SETTLE signal is inactive and the synchronized BREQ signal is active, then the next state is also CUA state 566. When CUA state 566 is the present state and the ARB MASK signal is inactive, the synchronized HLDA signal is inactive, the REF REQ PEND signal is inactive, the TIMER TUP signal is active, the ARB SETTLE signal is active and the ARB BUS EQF signal is active, then the next state is IUA state 568. Additionally, when CUA state 566 is the present state and the ARB MASK signal is inactive, the synchronized HLDA signal is inactive and the REF REQ PEND signal is active, then the next state is IUA state 562. Also, when CUA state 566 is the present state and the ARB MASK signal is inactive, the synchronized HLDA signal in inactive, the REF REQ PEND signal is inactive, the TIMER TUP signal is active, the ARB SETTLE signal is inactive and the synchronized BREQ signal is inactive, then the next state is also IUA state 568.

While in IUA state 568, the ARB/GRANT signal is in the arbitration state, the CPU HOLD signal in active, the REFRESH ACK signal is inactive, the DMA ACK signal is inactive and the ARB MASK signal is inactive. During IUA state 568, next state generator circuit 542 monitors the ARB MASK signal, the synchronized HLDA signal, the REF REQ PEND signal, the CPU CYC EN signal, the TIMER TUP signal, the ARB SETTLE signal, the ARB BUS EQF signal, the CHNL VALID signal, the synchronized BREQ signal and the synchronized ARB HOLD signal. When IUA state 568 is the present state and the ARB MASK signal is inactive, the synchronized HLDA signal is inactive and the synchronized ARB HOLD signal is invalid, then the next state is also IUA state 568. When IUA state 568 is the present state and the ARB MASK signal is inactive, the synchronized HLDA signal is active, the REF REQ PEND signal is inactive, the CPU CYC EN signal is inactive, the ARB SETTLE signal is inactive and the synchronized ARB HOLD signal is inactive, then the next state is also IUA state 568. When IUA state 568 is the present state and the ARB MASK signal is inactive and the synchronized ARB HOLD signal is active, then the next state is also IUA state 568; this signal combination allows whichever device controls I/O bus 18 to complete a transfer while CACP 53 initiates another arbitration cycle. The transition from IUA state 568 to IUA state 568 insures that CACP state machine 534 remains in an idle state and thus that CACP controller does not reallocate I/O bus 18 to a new controller device. When IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is inactive, the synchronized ARB HOLD signal is inactive and the synchronized BREQ signal is inactive, then the next state is IUA state 566.

Alternately, when IUA state 568 is the present state and the ARB MASK signal is inactive, the synchronized HLDA signal is active, the REF REQ PEND signal is inactive, the CPU CYC EN signal is active, the TIMER TUP signal is inactive, the ARB SETTLE signal is inactive and the ARB MASK signal is inactive, then the next state is CUA state 566. When IUA state 568 is the present state and the ARB MASK signal is inactive, the synchronized HLDA signal is active, the REF REQ PEND signal is inactive, the CPU CYC EN signal is active, the TIMER TUP signal is inactive, the ARB SETTLE signal is active, the ARB BUS EQF signal is inactive and the ARB MASK signal is inactive, then the next state is CUA state 566. When IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is inactive, the synchronized ARB HOLD signal is inactive and the synchronized BREQ signal is active, then the next state is CUA state 566.

When IUA state 568 is the present state and the ARB MASK signal is inactive, the synchronized HLDA signal is active, the REF REQ PEND signal is active and the ARB MASK signal is inactive, then the next state is RUA state 570.

While in RUA state 570, the ARB/GRANT signal is in the arbitration state, the CPU HOLD signal is active, the REFRESH ACK signal is active, the DMA ACK signal is inactive and the ARB MASK signal is inactive. During RUA state 570, next state generator circuit 442 monitors the ARB MASK signal, the REF DONE signal, the REF PEND signal, the CPU CYC EN signal, the TIMER TUP signal, the ARB SETTLE signal, the ARB BUS EQF signal, the CHNL VALID signal and the synchronized ARB HOLD signal to determine the next state of CACP state machine 534. When RUA state 570 is the present state and the ARB MASK signal is inactive and the REF DONE signal is inactive, then the next state is also RUA state 570.

Alternately, when RUA state 570 is the present state and the ARB MASK signal is inactive, the REF DONE signal is active, the REF PEND signal is inactive, the CPU CYC EN signal is inactive and the ARB SETTLE signal is inactive, then the next state is IUA state 568. When RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is inactive, the CHNL VALID signal is inactive and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is inactive, the CHNL VALID signal is active and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is active and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is inactive, the ARB SETTLE signal is inactive and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is inactive, the ARB SETTLE signal is active, the ARB BUS EQF signal is inactive and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is inactive, the ARB SETTLE signal is active, the ARB BUS EQF signal is active and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is active and the ARB SETTLE signal is inactive, then the next state is IUA state 568. When RUA state 570 is the present state and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is inactive, the CHNL VALID signal is inactive and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is inactive, the CHNL VALID signal is active and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is active and the synchronized ARB HOLD signal is active, then the next state is IUA state 568. Finally, when the ARB MASK signal is active, the REF DONE signal is active and the REF PEND signal is active, then the next state is IUA state 568. The transition from RUA state 570 to IUA state 568 locks CACP state machine 534 in an idle state to allow a refresh device to steal cycles between the end of a refresh function and the allocation of I/O bus 18 to another controller device; this transition also allows a second arbiter to lock a first arbiter in an idle state for systems which include more than one I/O bus and arbiter.

When RUA state 570 is the present state and ARB MASK signal is inactive, the REF DONE signal is active, the REF PEND signal is inactive, the CPU CYC EN signal is active, the TIMER TUP signal is inactive, the ARB SETTLE signal is inactive and the synchronized ARB HOLD signal is inactive, then the next state is CUA state 566. When RUA state 570 is the present state and ARB MASK signal is inactive, the REF DONE signal is active, the REF PEND signal is inactive, the CPU CYC EN signal is active, the TIMER TUP signal is inactive, the ARB SETTLE signal is active, the ARB BUS EQF signal is inactive and the synchronized ARB HOLD signal is inactive, then the next state is CUA state 566.

Control cycles between CUA state 560, IUA state 562 and RUA state 564 while the ARB/GRANT signal remains in the arbitration state. Because exiting CUA state 560 requires communication with the CPU, any transition between CUA state 560 and RUA state 564 passes through IUA state 562 to allow the HOLD signal, HLDA signal handshake and thus to guarantee that the CPU has relinquished control of I/O bus 18. However, control can shift from RUA state 564 to CUA state 560 because refresh is an internal function and there is no handshake requirement after the refresh of memory is complete. Control shifts from RUA state 564 to IUA state 562 because there is another refresh request pending as indicated by the REFRESH PEND signal.

When CUA state 566 is the present state and the ARB MASK signal is inactive, the synchronized HLDA signal is inactive, the REF REQ PEND signal is inactive, the TIMER TUP signal is inactive, the ARB SETTLE signal is active and the ARB BUS EQF signal is active, then the next state is the grant state, CPU grant (CG) state 572. Additionally, when CUA state 566 is the present state and the ARB MASK signal is inactive, the synchronized HLDA signal is inactive, the REF REQ PEND signal is inactive, the TIMER TUP signal is active, the ARB SETTLE signal is active and the ARB BUS EQF signal is active, then the next state is also CG state 572.

While in CG state 572, the ARB/GRANT signal is in the grant state, the CPU HOLD signal is inactive, the REFRESH ACK signal is inactive, the DMA ACK signal is inactive and the ARB MASK signal is inactive. During CG state 572, next state generator circuit 542 monitors the ARB MASK signal, the synchronized HLDA signal, the CPU BURST signal, the TIMER TUP signal, the synchronized PREEMPT signal, the REF REQ PEND signal and the CPU CYC EN signal. When CG state 572 is the present state and the ARB MASK signal is inactive, the synchronized HLDA signal is inactive, the CPU BURST signal is inactive and the synchronized PREEMPT signal is inactive, then the next state is also CG state 572. Additionally, when the present state is CG state 572, and the ARB MASK signal is inactive, the synchronized HLDA signal is inactive, the CPU BURST signal is active and the TIMER TUP signal is inactive, then the next state is also CG state 572. When CG state 572 is the present state and the ARB MASK signal is inactive, the synchronized HLDA signal is inactive, the CPU BURST signal is active, the TIMER TUP signal is active and the synchronized PREEMPT signal is inactive, then the next state is also CG state 572. When CG state 572 is the present state and the ARB MASK signal is inactive and the synchronized HLDA signal is active, then the next state is also CG state 572.

When CG state 572 is the present state and the ARB MASK signal is inactive, the synchronized HLDA signal is inactive, the CPU BURST signal is inactive, the synchronized PREEMPT signal is inactive, the REF REQ PEND signal is inactive and the CPU CYC EN signal is active, then the next state is CUA state 566. When CG state 572 is the present state and the ARB MASK signal is inactive, the synchronized HLDA signal is inactive, the CPU BURST signal is active, the TIMER TUP signal is active, the synchronized PREEMPT signal is active, the REF REQ PEND signal is inactive and the CPU CYC EN signal is active, then the next state is CUA state 566.

When CG state 572 is the present state and the ARB MASK signal is inactive, the synchronized HLDA signal is inactive, the CPU BURST signal is inactive, the synchronized PREEMPT signal is active, the REF REQ PEND signal is inactive and the CPU CYC EN signal is inactive, then the next state is IUA state 568. When CG state 572 is the present state and the ARB MASK signal is inactive, the synchronized HLDA signal is inactive, the CPU BURST signal is inactive, the synchronized PREEMPT signal is active and the REF REQ PEND signal is active, then the next state is IUA state 568. When CG state 572 is the present state and the ARB MASK signal is inactive, the synchronized HLDA signal is inactive, the CPU BURST signal is active, the TIMER TUP signal is active, the synchronized PREEMPT signal is active, the REF REQ PEND signal is inactive and the CPU CYC EN signal is inactive, then the next state is IUA state 568. When CG state 572 is the present state and the ARB MASK signal is inactive, the synchronized HLDA signal is inactive, the CPU BURST signal is active, the TIMER TUP signal is active, the synchronized PREEMPT signal is active and the REF REQ PEND signal is active, then the next state is IUA state 568.

When IUA state 568 is the present state and the ARB MASK signal is inactive, the synchronized HLDA signal is active, the REF REQ PEND signal is inactive, the CPU CYC EN signal is active, the ARB SETTLE signal is active, the ARB BUS EQF signal is active and the synchronized ARB HOLD signal is inactive, then the next state is CG state 572. Additionally, when IUA state 568 is the present state and the ARB MASK signal is inactive, the synchronized HLDA signal is active, the REF REQ PEND signal is inactive, the CPU CYC EN signal is active, the TIMER TUP signal is inactive, the ARB SETTLE signal is active, the ARB BUS EQF signal is active, the CHNL VALID signal is active and the synchronized ARB HOLD signal is inactive, then the next state is CG state 572. Additionally, when IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is active, the ARB BUS EQF signal is active and the synchronized ARB HOLD signal is inactive, then the next state is CG state 572.

When IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is active, the ARB BUS EQF signal is active and the synchronized ARB HOLD signal is inactive, then the next state is external master grant (MG) state 574. During MG state 574 the ARB/GRANT signal is in the grant state, the CPU HOLD signal is active, the REFRESH ACK signal is inactive, the DMA ACK signal is inactive and the CHNLBUSY signal is inactive. While in MG state 574, next state generator circuit 542 monitors the ARB MASK signal and the synchronized CHNL ACT signal. When MG state 574 is the present state and the ARB MASK signal is inactive and the synchronized CHNL ACT signal is inactive then the next state is MG state 574. When MG state 574 is the present state and the ARB MASK signal is inactive and the synchronized CHNL ACT signal is active then the next state is external master grant active (MGA) state 578.

While in MGA state 578, the ARB/GRANT signal is in the grant state, the CPU HOLD signal is active, the REFRESH ACK signal is inactive, the DMA ACK signal is inactive and the CHNLBUSY signal is active. During MGA state 578, next state generator circuit 542 monitors the ARB MASK signal, the synchronized CHNL ACT signal, the REF REQ PEND signal, the CPU CYC EN signal and the synchronized ARB HOLD signal. When MGA state 578 is the present state and the ARB MASK signal is inactive and the synchronized CHNL ACT signal is active, then the next state is also MGA state 578.

When MGA state 578 is the present state and the ARB MASK signal is inactive, the synchronized CHNL ACT signal is inactive, the REF REQ PEND signal is inactive, the CPU CYC EN signal is active and the synchronized ARB HOLD signal is inactive, the next state is CUA state 566. When MGA state 578 is the present state and the ARB MASK signal is inactive, the synchronized CHNL ACT signal is inactive, the REF REQ PEND signal is active and the synchronized ARB HOLD signal is inactive, the next state is RUA state 570.

When MGA state 578 is the present state and the ARB MASK signal is inactive, the synchronized CHNL ACT signal is inactive, the REF REQ PEND signal is inactive and the CPU CYC EN signal is inactive, then the next state is IUA state 568. When MGA state 578 is the present state and the ARB MASK signal is inactive, the synchronized CHNL ACT signal is inactive, the REF REQ PEND signal is inactive, the CPU CYC EN signal is active and the synchronized ARB HOLD signal is active, the next state is IUA state 568. When MGA state 578 is the present state and the ARB MASK signal is inactive, the synchronized CHNL ACT signal is inactive, the REF REQ PEND signal is active, and the synchronized ARB HOLD signal is active, the next state is IUA state 568. The transition from MGA state 578 to IUA state 568 indicates that a controller device on I/O bus 18 has completed its portion of a transfer; this transition forces CACP state machine 534 to remain in an idle state so that arbitration can be locked, thus allowing a local device such as bus interface unit 54 to complete the local transfer cycles from the previous controller device while allowing arbitration to occur in parallel.

When IUA state 568 is the present state and the ARB MASK signal is inactive, the synchronized HLDA signal is active, the REF REQ PEND signal is inactive, the CPU CYC EN signal is inactive, the ARB SETTLE signal is active, the ARB BUS EQF signal is inactive, the CHNL VALID signal is active and the synchronized ARB HOLD signal is inactive, then the next state is internal DMA grant, not active (DG) state 576. When IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is active, the ARB BUS EQF signal is inactive, the CHNL VALID signal is active and the synchronized ARB HOLD signal is inactive, then the next state is also DG state 576.

While in DG state 576, the ARB/GRANT signal is in the grant state, the CPU HOLD signal is inactive, the REFRESH ACK signal is inactive, the DMA ACK signal is active and the CHNLBUSY signal is inactive. During DG state 576, next state generator circuit 542 monitors the ARB MASK signal and the synchronized CHNL ACT signal. When DG state 576 is the present state and the ARB MASK signal is inactive and the synchronized CHNL ACT signal is inactive, DG state 576 is also the next state.

When DG state 576 is the present state and the ARB MASK signal is inactive and the synchronized CHNL ACT signal is active, the next state is internal DMA grant active (DGA) state 580. While in DGA state 580, the ARB/GRANT signal is in the grant state, the CPU HOLD signal is active, the REFRESH ACK signal is inactive, the DMA ACK signal is active and the CHNLBUSY signal is active. During DGA state 580, next state generator circuit 542 monitors the ARB MASK signal, the synchronized CHNL ACT signal, the REF REQ PEND signal, the CPU CYC EN signal and the synchronized ARB HOLD signal. When DGA state 580 is the present state and the ARB MASK signal is inactive and the synchronized CHNL ACT signal is active, then the next state is also DGA state 580. When DGA state 580 is the present state and the ARB MASK signal is inactive, the synchronized CHNL ACT signal is inactive, the REF REQ PEND signal is inactive, the CPU CYC EN signal is inactive and the synchronized ARB HOLD signal is inactive, the next state is IUA state 568. When DGA state 580 is the present state and the ARB MASK signal is inactive, the synchronized CHNL ACT signal is inactive, the REF REQ PEND signal is inactive, the CPU CYC EN signal is active and the synchronized ARB HOLD signal is inactive, the next state is CUA state 566. When DGA state 580 is the present state and the ARB MASK signal is inactive, the synchronized CHNL ACT signal is inactive, the REF REQ PEND signal is active and the synchronized ARB HOLD signal is inactive, the next state is RUA state 570.

When DGA state 580 is the present state and the ARB MASK signal is inactive, the synchronized CHNL ACT signal is inactive, the REF REQ PEND signal is inactive, the CPU CYC EN signal is inactive and the synchronized ARB HOLD signal is active, the next state is DMA unmasked arbitration (DUA) state 582. When DGA state 580 is the present state and the ARB MASK signal is inactive, the synchronized CHNL ACT signal is inactive, the REF REQ PEND signal is inactive, the CPU CYC EN signal is active and the synchronized ARB HOLD signal is active, the next state is DUA state 582. When DGA state 580 is the present state and the ARB MASK signal is inactive, the synchronized CHNL ACT signal is inactive, the REF REQ PEND signal is active and the synchronized ARB HOLD signal is active, the next state is DUA state 582. The transition from DGA state 580 to DUA state 582 indicates that DMA controller 52 has completed reading information from either memory of a DMA slave expansion device, but that DMA controller 52 still has data in it which must be written to memory. The DUA state allows DMA controller 52 to remain active while allowing CACP 53 to initiate in parallel another arbitration cycle. Upon entering DUA state 582, arbitration is locked until the ARB HOLD signal goes inactive, to insure that CACP 53 does not reallocate I/O bus 18.

While in DUA state 582, the ARB/GRANT signal is in the grant state, the CPU HOLD signal is active, the REFRESH ACK signal is inactive, the DMA ACK signal is active and the ARB MASK signal is inactive. During DUA state 582, next state generator circuit 542 monitors the ARB MASK signal, the synchronized ARB HOLD signal, the REF REQ PEND signal and the CPU CYC EN signal. When DUA state 582 is the present state and the ARB MASK signal is inactive and the synchronized ARB HOLD signal is active, then the next state is also DUA state 582. The transition from DUA state 582 to DUA state 582 indicates that DMA controller 52 is currently flushing the data information which is stored in it; this transition insures that CACP 53 does not reallocate I/O bus 18 while DMA controller 52 is active however, CACP 53 may be arbitrating for the next grant cycle. When DUA state 582 is the present state and the ARB MASK signal is inactive, the synchronized ARB HOLD signal is inactive, the REF REQ PEND signal is inactive and the CPU CYC EN signal is inactive, the next state is IUA state 568. When DUA state 582 is the present state and the ARB MASK signal is inactive, the synchronized ARB HOLD signal is inactive, the REF REQ PEND signal is inactive and the CPU CYC EN signal is active, the next state is CUA state 566. When DUA state 582 is the present state and the ARB MASK signal is inactive, the synchronized ARB HOLD signal is inactive and the REF REQ PEND signal is active, the next state is RUA state 570. By providing DUA state 582, the DMA ACK signal remains active, thus allowing DMA controller 52 to initiate arbitration for I/O bus 18. Thus, system 10 is able to complete a DMA transfer in parallel with arbitrating for the next grant cycle of I/O bus 18.

Control can shift from IUA state 568 to MG state 576. More specifically, when IUA state 568 is the present state and the ARB MASK signal is inactive, the synchronized HLDA signal is active, the REF REQ PEND signal is inactive, the CPU CYC EN signal is inactive, the ARB SETTLE signal is active, the ARB BUS EQF signal is inactive, and the CHNL VALID signal is inactive, then the next state is MG state 576. When IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is active, the ARB BUS EQF signal is inactive, and the CHNL VALID signal is inactive, then the next state is MG state 576.

Control can also shift from RUA state 570 to CG state 572, MG state 574 or DG state 576. More specifically, when RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is active and the synchronized ARB HOLD signal is inactive, CG state 566 is the next state. When RUA state 570 is the present state and the ARB MASK signal is inactive, the REF DONE signal is active, the REF PEND signal is inactive, the CPU CYC EN signal is active, the TIMER TUP signal is inactive, the ARB SETTLE signal is active, the ARB BUS EQF signal is active and the synchronized ARB HOLD signal is inactive, CG state 566 is also the next state. When RUA state 570 is the present state and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is active and the synchronized ARB HOLD signal is inactive, CG state 572 is also the next state. When RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is active, the CHNL VALID signal is inactive and the synchronized ARB HOLD signal is inactive, MG state 574 is the next state. When RUA state 570 is present state and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is inactive, the CHNL VALID signal is inactive and the synchronized ARB HOLD signal is inactive, MG state 574 is also the next state. When RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is inactive, the CHNL VALID signal is active and the synchronized ARB HOLD signal is inactive, DG state 576 is the next state. When RUA state 570 is the present and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is inactive, the CHNL VALID signal is active and the synchronized ARB HOLD signal is inactive, DG state 576 is also the next state.

Control may also return to masked arbitration portion 550 from CUA state 566, IUA state 568, RUA state 570 or DUA state 582. More specifically, when CUA state 566 is the present state and the ARB MASK signal goes active, the synchronized HLDA signal is inactive and the REF REQ PEND signal is inactive then the next state is CMA state 560. When CUA state 566 is the present state and the ARB MASK signal is active and the synchronized HLDA signal is active, then the next state is also CMA state 560. When CUA state 566 is the present state and the ARB MASK signal goes active, the synchronized HLDA signal is inactive and the REF REQ PEND signal is active then the next state is IMA state 562.

When IUA state 566 is the present state and the ARB MASK signal is active, the synchronized HLDA signal is inactive and the synchronized ARB HOLD signal is inactive, then the next state is IMA state 562. When IUA state 566 is the present state and the ARB MASK signal is active and the synchronized ARB HOLD signal is active, then the next state is also IMA state 562; thus allowing a device to complete a transfer while CACP 53 returns to an idle condition. The transition from IUA state 566 to IMA state 562 insures that CACP state machine 534 remains in an idle state and thus that CACP controller does not reallocate I/O bus 18 to a new controller device. When IUA state 566 is the present state and the ARB MASK signal is active, the synchronized HLDA signal is active, the REF REQ PEND signal is inactive and the synchronized ARB HOLD signal is inactive, then the next state is CMA state 560. When IUA state 566 is the present state and the ARB MASK signal is active, the synchronized HLDA signal is active, the REF REQ PEND signal is active and the synchronized ARB HOLD signal is inactive, then the next state is RMA state 564.

When RUA state 566 is the present state and the ARB MASK signal is active and the REF DONE signal is inactive, then RMA state 564 is the next state. When RUA state 566 is the present state and the ARB MASK signal is active, the REF DONE signal is active, the REF PEND signal is inactive and the synchronized ARB HOLD signal is inactive, then CMA state 560 is the next state. When RUA state 566 is the present state and the ARB MASK signal is active, the REF DONE signal is active, the REF PEND signal is inactive and the synchronized ARB HOLD signal is active, then IMA state 562 is the next state. The transition from RUA state 566 to IMA state 562 locks CACP state machine 534 in an idle state to allow a refresh device to steal cycles between the end of a refresh function and the allocation of I/O bus 18 to another controller device. When RUA state 566 is the present state and the ARB MASK signal is active, the REF DONE signal is active and the REF PEND signal is active, then IMA state 562 is the next state.

Control may also shift from the states of grant portion 554, i.e., CG state 572, MG state 574, MGA state 578, DG state 576 and DGA state 580, to masked arbitration portion 550. More specifically, when CG state 572 is the present state and the ARB MASK signal is active and the synchronized HLDA signal is active, then the next state is CMA state 560. When CG state 572 is the present state and the ARB MASK signal is active, the synchronized HLDA signal is inactive and the REF REQ PEND signal is inactive, then the next state is CMA state 560. When CG state 572 is the present state and the ARB MASK signal is active, the synchronized HLDA signal is inactive and the REF REQ PEND signal is active, then the next state is IMA state 560.

When MG state 574 is the present state and the ARB MASK signal is active, then the next state is IMA state 562. When MGA state 578 is the present state and the ARB MASK signal is active, then the next state is also IMA state 562.

When DG state 576 is the present state and the ARB MASK signal is active then the next state is DMA masked arbitration (DMA) state 584. While in DMA state 584, the ARB/GRANT signal is in the arbitration state, the CPU HOLD signal is active, the REFRESH ACK signal is inactive, the DMA ACK signal is active and the ARB MASK signal is active. During DMA state 584, next state generator circuit 542 monitors the ARB MASK signal and the synchronized CHNL ACT signal. When DMA state 584 is the present state and the synchronized ARB HOLD signal is active the next state is also DMA state 584. The transition from DMA state 582 to DMA state 582 indicates that DMA controller 52 is currently flushing the data information which is stored in it; this transition insures that CACP 53 does not reallocate I/O bus 18 while DMA controller 52 is active however, CACP 53 may be arbitrating for the next grant cycle. When DMA state 584 is the present state and the synchronized ARB HOLD signal is inactive, the next state is IMA state 562. By providing DMA state 584, a DMA transfer may remain active to allow DMA controller 52 to finish cycle for transfer. In this way, DMA state 584 allows for orderly recovery from a bus error.

When DGA is the present state and the ARB MASK signal is active, then the next state is DMA state 584. Alternately, when DUA state 582 of unmasked arbitration portion 552 is the present state and the ARB MASK signal is active, then the next state is also DMA state 582.

Figure 12:
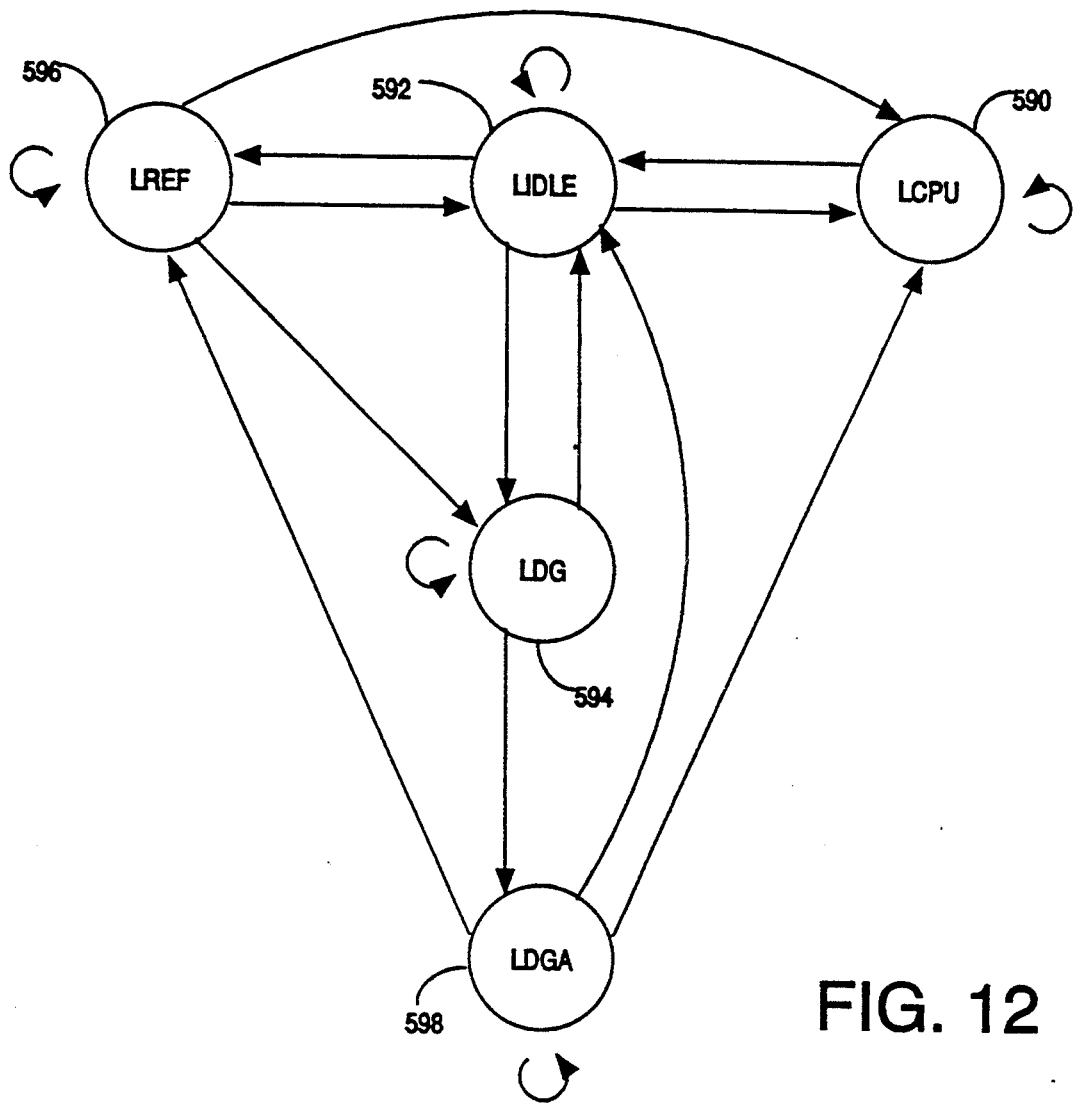
FIG. 12 is a state diagram of the operation of the local arbitration control point of the FIG. 9 CACP circuit.

Referring to FIG. 12, arbitration control state machine 540 uses LACP state machine 520 when, upon power-on, the CACP MODE signal is inactive; control remains with LACP state machine 520 unless the configuration of computer system 10 is changed. When arbitration control state machine 540, and thus CACP 53, are using LACP state machine 520, CACP 53 is operating in a local mode. When operating in a local mode, arbitration of CACP 53 is under control of another central arbitration control point. Thus, LACP state machine 520 need not perform many of the control functions of CACP state machine 534.

More specifically, upon power-on of computer system 10, LACP state machine starts control in local CPU (LCPU) state 590. While in LCPU state 590, the HOLD signal is inactive, the REF ACK signal is inactive and the DMA ACK signal is inactive. While in LCPU state 590, LACP state machine 520 monitors the synchronized HLDA signal, the REF REQ PEND signal, the ARB/GRANT signal and the CHNL VALID signal. When LCPU state 590 is the present state and the synchronized HLDA signal is inactive, the REF REQ PEND signal is inactive, the ARB/GRANT signal is in the grant state and the CHNL VALID signal is inactive, then the next state is also LCPU state 590. When LCPU state 590 is the present state and the synchronized HLDA signal is inactive, the REF REQ PEND signal is inactive and the ARB/GRANT signal is in the arbitration state, then the next state is also LCPU state 590. When LCPU state 590 is the present state and the synchronized HLDA signal is active, then the next state is also LCPU state 590. When LCPU state 590 is the present state and the synchronized HLDA signal is inactive, the REF REQ PEND signal is inactive, the ARB/GRANT signal is in the grant state and the CHNL VALID signal is active, then the next state is local idle (LIDLE) state 592. When LCPU state 590 is the present state and the synchronized HLDA signal is inactive and the REF REQ PEND signal is active, then the next state is also LCPU state 590.

While in LIDLE state 592, the HOLD signal is active, the REF ACK signal is inactive, and the DMA ACK signal is inactive. While in LIDLE state 592, LACP state machine 520 monitors the synchronized HLDA signal, the REF REQ PEND signal, the ARB/GRANT signal and the CHNL VALID signal. When LIDLE state 592 is the present state and the synchronized HLDA signal is inactive, then the next state is also LIDLE state 592. When LIDLE state 592 is the present state, and the synchronized HLDA signal is active, the REF REQ PEND signal is inactive, the ARB/GRANT signal is in the grant state and the CHNL VALID signal is inactive, then the next state is LCPU state 590. When LIDLE state 592 is the present state, and the synchronized HLDA signal is active, the REF REQ PEND signal is inactive, the ARB/GRANT signal is in the grant state and the CHNL VALID signal is active, then the next state is LCPU state 590. When LIDLE state 592 is the present state, and the synchronized HLDA signal is active, the REF REQ PEND signal is inactive and the ARB/GRANT signal is in the arbitration state, then the next state is LCPU state 590. When LIDLE state 592 is the present state, and the synchronized HLDA signal is active, the REF REQ PEND signal is inactive, the ARB/GRANT signal is in the grant state and the CHNL VALID signal is active, then the next state is local DMA grant (LDG) state 594. When LIDLE state 592 is the present state, and the synchronized HLDA signal is active and the REF REQ PEND signal is active, then the next state is local refresh state 596.

While in LREF state 596, the HOLD signal is active, the REF ACK signal is active, and the DMA ACK signal is inactive. While in LREF state 596, LACP state machine 520 monitors the REF REQ PEND signal, the ARB/GRANT signal, the CHNL VALID signal and the REF DONE signal. When LREF state 596 is the present state and the REF DONE signal is inactive, then the next state is also LREF state 596. When LREF state 596 is the present state and the REF REQ PEND signal is inactive, the ARB/GRANT signal is in the grant state, the CHNL VALID signal is inactive and the REF DONE signal is active, then the next state is LCPU state 590. When LREF state 596 is the present state and the REF REQ PEND signal is inactive, the ARB/GRANT signal is in the grant state, the CHNL VALID signal is active and the REF DONE signal is active, then the next state is LDG state 594. When LREF state 596 is the present state and the REF REQ PEND signal is inactive, the ARB/GRANT signal is in the arbitration state and the REF DONE signal is active, then the next state is LCPU state 590. When LREF state 596 is the present state and the REF REQ PEND signal is active and the REF DONE signal is active, then the next state is LIDLE state 596.

While in LDG state 594, the HOLD signal is active, the REF ACK signal is inactive, the DMA ACK signal is active and the DMA ACTIVE signal is inactive. While in LDG state 594, LACP state machine 520 monitors the ARB/GRANT signal and the DMA ACTIVE signal. When LDG state 594 is the present state and the ARB/GRANT signal is in the grant state and the DMA ACTIVE signal is inactive, then the next state is LDG state 594. When LDG state 594 is the present state and the ARB/GRANT signal is in the grant state and the DMA ACTIVE signal is active, then the next state is local DMA grant active (LDGA) state 598. When LDG state 594 is the present state and the ARB/GRANT signal is in the arbitration state, then the next state is LIDLE state 592.

While in LDGA state 598, the HOLD signal is active, the REF ACK signal is inactive, the DMA ACK signal is active and the DMA ACTIVE signal is active. While in LDGA state 598, LACP state machine 520 monitors the ARB/GRANT signal, the REF REQ PEND signal and the DMA ACTIVE signal. When LDGA state 598 is the present state and the ARB/GRANT signal is in the arbitration state and the DMA ACTIVE signal is active, then the next state is also LDGA state 598. When LDGA state 598 is the present state and the ARB/GRANT signal is in the grant state and the DMA ACTIVE signal is active, then the next state is also LDGA state 598. When LDGA state 598 is the present state and the ARB/GRANT signal is in the grant state, the DMA ACTIVE signal is inactive and the REF REQ PEND signal is inactive, then the next state is LCPU state 590. When LDGA state 598 is the present state and the REF REQ PEND signal is active, then the next state is LREF state 596. When LDGA state 598 is the present state and the ARB/GRANT signal is in the grant state and the DMA ACTIVE signal is active, then the next state is LIDLE state 592.

Referring to FIGS. 1, 2, 7, 9, 11 and 13, during internal memory read state 354 and ILIST memory read state 368 of supervisory state machine 302, initial error detection information is passed to error detection circuit 115. The initial error detection information enables error detection circuit 115 to check for a plurality of different error conditions. Examples of error conditions which are monitored are: when an SCB pointer address is not double word aligned; when a SCB ILIST address is not double word aligned; when a SCB ILIST count is not a multiple of eight bytes; when a SCB ILIST count equals zero; and, when the current transfer count equals zero.

If, during a DMA transfer, an error condition is detected, error detection circuit 115 activates the DMA ABORT signal, which is provided to port 90 control circuit 506 of CACP 53. Port 90 control circuit 506 combines the DMA ABORT signal with other error condition signals (e.g., the TOUT STR signal) and sets the TIMEOUT signal active and the ARB MASK signal active. The TIMEOUT signal is provided to DMA control state machine 120 as well as devices on base portion 22 (e.g., bus interface circuit 54) and processor portion 24 to indicate that an error has occurred. An active TIMEOUT signal causes DMA state machine 120 and bus interface unit 54 to gracefully complete (i.e., the current bus cycle is completed thereby leaving the bus in an operational state) the current operation and enter error state 376. When an error condition occurs a DMA transfer, control shifts from DMA execution state 360 to error state 376, thus the data associated with the transfer that caused the error, i.e., potentially corrupted data, are not stored. Rather, because memory write state 362 is not executed, the control information from the last known good DMA grant cycle remains intact, thus allowing processor 30 to recover from the error and restart the DMA transfer where it left off prior to the error condition. Upon entering error state 376, all of the circuits of DMA controller 52 but for control backup circuit 110 FIFO backup memory 108 and PIO interface 112 are reset. Thus insuring that DMA controller 52 is in a known state. Supervisory state machine 302 remains in error state 376 until CACP 53 sets the DMA ACK signal inactive, which causes control of computer system 10 to return to CACP 53. The active TIMEOUT signal also generates an active non maskable interrupt (NMI) signal to alert processor 30 that an error has occurred that requires servicing.

In parallel with the recovery procedures that are instituted because of the active TIMEOUT signal, the active ARB MASK signal causes CACP state machine 534 to enter DMA state 584. This state allows CACP 53 to immediately change the ARB/GRANT signal to the arbitration state while allowing the DMA ACK signal to remain active until DMA controller 52 completes its error recovery procedures. By driving the ARB/GRANT signal to the arbitration state, CACP 53 can forcibly take control of I/O bus 18. Any expansion devices 19 which are connected to I/O bus 18 must immediately relinquish control of the bus. However, DMA controller 52 releases control of the bus in an orderly fashion. To achieve this, DMA controller 52 provides an active ARB HOLD signal to CACP 53 in order to lock CACP 53 in DMA state 584 until supervisory state machine 302 of DMA control state machine 120 has completed its error recovery procedures. After the error recovery procedures have been completed, DMA controller 52 sets the ARB HOLD signal inactive, allowing CACP 53 to resume normal masked arbitration operation.

Other Embodiments

Other embodiments are within the following claims.

We claim:

1. In a data processing system—containing a processor (CPU), a memory subsystem, I/O devices, and a bus linking said memory subsystem to said CPU and devices—apparatus responsive to control information supplied by said CPU, and designating one of said devices, for operating transparent to said CPU to control said bus and conduct a series of multiple DMA data transfer operations over said bus between said memory subsystem and said designated one of said devices; said apparatus comprising means effective during each DMA data transfer in said series of data transfers for storing information indicating a predetermined prior state of operation of said DMA controller at completion of a prior data transfer in the same series, an error detection circuit, said error detection circuit detecting error in individual said data transfer operations in said series of operations, by monitoring signals indicating the progress of the respective operation, and generating an error indication upon detecting a said error, a direct memory access control circuit, said direct memory access control circuit directly controlling said DMA data transfer operations, said direct memory access control circuit being responsive to said error indication for terminating a respective said series of DMA data transfer operations and performing predetermined completion tasks; said predetermined completion tasks including tasks for presenting a non-maskable interrupt to said CPU requiring said CPU to recognize said information indicating said predetermined prior state, and tasks for placing said bus under exclusive control of said CPU until it has responded to said interrupt and recognized said predetermined prior state; recognition of said predetermined prior state enabling said CPU to restart said series of DMA data transfer operations where it had been terminated, rather than requiring repetition of the entire series of data transfer operations including operations that had been successfully completed prior to detection of said error.

2. The apparatus of claim 1 further comprising an arbiter circuit,
said arbiter circuit receiving said error indication and generating a timeout signal in response to said error indication,
said direct memory access control circuit receiving said timeout signal and performing said completion tasks in response to said timeout signal.

3. The apparatus of claim 2 wherein
said arbiter circuit includes a refresh circuit,
said refresh circuit detecting an error condition when said memory subsystem has not been adequately refreshed and generating a refresh error signal upon detecting this error condition,
said arbiter circuit generating said timeout signal in response to said refresh error signal.

4. The apparatus of claim 2 wherein
said arbiter circuit generates a masked arbitration signal that places said bus under exclusive control of said CPU and inhibits use of said bus by devices other than said CPU until a specific action is taken by said CPU to reset said masked arbitration signal, and
said arbiter circuit includes an arbitration state machine,
said arbitration state machine having unmasked and masked arbitration states, in which said arbiter circuit is respectively permitted and not permitted to arbitrate for control of said bus, said arbitration state machine transitioning to said masked arbitration state in response to said masked arbitration signal.

5. The apparatus of claim 1 wherein
said direct memory access control circuit includes a supervisory state machine, and
said supervisory state machine includes an error state,
said supervisory state machine transitioning to said error state in response to said error indication, and operating in that state to cause said direct memory access control circuit to perform said completion tasks.

6. The apparatus of claim 5 wherein
said direct memory access control circuit includes an execution state machine, and
said execution state machine includes a transfer complete state in which said execution state machine indicates conclusion of an invalid data transfer operation,
said execution state machine transitioning to said transfer complete state at the end of any cycle of activity on said bus which coincides with said timeout signal being active,
said transfer complete state causing said supervisory state machine to transition to said error state after a present transfer is complete.

7. The apparatus of claim 1 further comprising
a control backup circuit,
said control backup circuit storing a copy of said control information.

8. An apparatus for allowing direct access to memory in an information handling system comprising
a processor,
a system memory,
an I/O bus
said I/O bus allowing transfer of information between said processor, said system memory and expansion devices,
an error detection circuit,
said error detection circuit monitoring transfers of information on said bus and generating an error indication upon detecting an error in a said transfer, and
a direct memory access control circuit,
said direct memory access control circuit controlling a direct memory access transfer,
said direct memory access control circuit terminating a direct memory transfer operation, in response to receipt of a said error indication from said error detection circuit, and performing predetermined completion tasks prior to terminating said direct memory access transfer operation, said predetermined completion tasks including tasks to interrupt said processor for notifying said processor of a state said direct memory access control circuit was in prior to said error indication, tasks to present an interrupt for communicating said prior state to said CPU, and tasks to place said bus under exclusive control of said CPU until it has responded to said interrupt and recognized said prior state.

9. The apparatus of claim 8 further comprising
an arbiter circuit,
said arbiter circuit receiving said error indication information and generating a timeout signal based upon said error indication information,
said direct memory access control circuit performing said completion tasks in response to said timeout signal.

10. The apparatus of claim 9 wherein
said arbiter circuit includes a refresh circuit,
said refresh circuit detecting an error condition when said system memory has not been adequately refreshed and generating a refresh error signal upon detecting this error condition,
said arbiter circuit generating said timeout signal in response to said refresh error signal.

11. The apparatus of claim 9 wherein
said arbiter circuit generates a masked arbitration signal, and
said arbiter circuit includes an arbitration state machine,
said arbitration state machine having unmasked and masked arbitration states respectively allowing and preventing arbitration for control of said bus, said arbitration state machine transitioning into a masked arbitration state when said masked arbitration signal is active.

12. The apparatus of claim 8 wherein
said direct memory access control circuit includes a supervisory state machine, and
said supervisory state machine includes an error state,
said error state causing said direct memory access control circuit to perform said predetermined completion tasks.

13. The apparatus of claim 12 wherein
said direct memory access control circuit includes an execution state machine, and
said execution state machine includes a transfer complete state,
said execution state machine transitioning to said transfer complete state at the end of any cycle of activity on said bus which coincides with said timeout signal being active,
said transfer complete state causing said supervisory state machine to transition to said error state after a present transfer is complete.

14. The apparatus of claim 8 further comprising
a control backup circuit,
said control backup circuit storing a copy of said control information.

15. In a computer system including a CPU, a memory subsystem, at least one I/O device, at least one DMA controller having direct access to said memory subsystem, and a bus linking said DMA controller and other elements of said system to said memory subsystem—wherein said DMA controller interfaces between said at least one I/O device and said memory subsystem for conducting DMA data transfers transparent to said CPU in response to control information supplied to said DMA controller by said CPU, wherein said DMA controller has plural internal DMA channels for conducting DMA data transfers concurrently relative to plural I/O devices, and wherein said DMA controller includes means for arbitrating for access to said bus when it is ready to conduct portions of said DMA data transfers relative to individual said DMA channels—error detection and recovery apparatus comprising:

means for detecting an error in a DMA data transfer occurring in any one of said DMA channels;

means effective for each state of operation of said DMA controller, relative to each said DMA channel, for storing information indicating a predetermined prior state of operation of said DMA controller relative to the same DMA channel; said prior state corresponding to a state the controller was in when it completed a data transfer representing a last valid transfer of data prior to detection of said error;

means responsive to detection of said error for presenting an interrupt to communicate said prior state to said CPU;

means cooperative with said interrupt presenting means for rendering said bus accessible only to said CPU until said CPU responds to said interrupt; and means for enabling said controller to continue conducting DMA transfers relative to DMA channels other than the channel in which said error was detected, after said CPU has responded to said interrupt, but before said CPU has taken any recovery action relative to the operation that was being conducted relative to the channel in which said error was detected.

* * * * *